US012587962B2

(12) United States Patent
Bergström et al.

(10) Patent No.: US 12,587,962 B2
(45) Date of Patent: Mar. 24, 2026

(54) METHODS OF HANDLING DISCONTINUOUS RECEPTION INACTIVITY TIMERS BASED ON SCELL ACTIVATION AND RELATED DEVICES AND NODES

(71) Applicant: Telefonaktiebolaget LM Ericsson (publ), Stockholm (SE)

(72) Inventors: Mattias Bergström, Sollentuna (SE); Martin Van Der Zee, Malmö (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 372 days.

(21) Appl. No.: 18/014,569

(22) PCT Filed: Sep. 23, 2021

(86) PCT No.: PCT/SE2021/050923
§ 371 (c)(1),
(2) Date: Jan. 5, 2023

(87) PCT Pub. No.: WO2022/081061
PCT Pub. Date: Apr. 21, 2022

(65) Prior Publication Data
US 2023/0262598 A1     Aug. 17, 2023

Related U.S. Application Data

(60) Provisional application No. 63/093,064, filed on Oct. 16, 2020.

(51) Int. Cl.
*H04W 52/02* (2009.01)
*H04W 76/28* (2018.01)

(52) U.S. Cl.
CPC ... *H04W 52/0216* (2013.01); *H04W 52/0241* (2013.01); *H04W 76/28* (2018.02)

(58) Field of Classification Search
None
See application file for complete search history.

(56) References Cited

U.S. PATENT DOCUMENTS

| | | |
|---|---|---|
| 10,708,832 B2 | 7/2020 | Jia et al. |
| 2010/0322173 A1* | 12/2010 | Marinier ............... H04W 76/28 |
| | | 370/329 |

(Continued)

FOREIGN PATENT DOCUMENTS

| | | |
|---|---|---|
| EP | 3716698 A1 | 9/2020 |
| WO | 2016162592 A1 | 10/2016 |

(Continued)

OTHER PUBLICATIONS

First Examination Report mailed Sep. 6, 2023 for Indian Application No. 202247075710, 7 pages.

(Continued)

*Primary Examiner* — Walter J Divito
(74) *Attorney, Agent, or Firm* — Sage Patent Group

(57) ABSTRACT

A method is disclosed for operating a communication device that is configured with a plurality of cells to provide carrier aggregation for communication with a wireless communication network. The method includes receiving an instruction to activate a cell of the plurality of cells that are configured for the communication device, and starting a discontinuous reception (DRX) inactivity timer associated with the cell of the plurality of cells responsive to receiving the instruction to active the cell of the plurality of cells. Corresponding communication devices are disclosed. Also, related radio access network nodes and methods are disclosed.

19 Claims, 12 Drawing Sheets

(56) References Cited

U.S. PATENT DOCUMENTS

| | | | |
|---|---|---|---|
| 2018/0132292 A1 | 5/2018 | Yang et al. | |
| 2019/0132109 A1 | 5/2019 | Zhou et al. | |
| 2020/0267777 A1 | 8/2020 | Dinan | |
| 2021/0203468 A1* | 7/2021 | Yi | H04W 72/0453 |
| 2022/0159568 A1* | 5/2022 | Kim | H04W 52/0212 |

FOREIGN PATENT DOCUMENTS

| | | | |
|---|---|---|---|
| WO | 2019084570 A1 | 5/2019 | |
| WO | 2020198746 A1 | 10/2020 | |

OTHER PUBLICATIONS

PCT International Search Report and Written Opinion for International Application No. PCT/SE2021/050923 mailed Dec. 7, 2021, 10 pages.

Huawei et al., "BWP/SCell Operation for UE Power Saving", 3GPP TSG RAN WG1 Meeting #97, R1-1907518, Reno, USA, May 13-17, 2019, 6 pages.

3GPP, Technical Specification Group Radio Access Network, NR, "Physical Layer Procedures for Control (Release 16)", 3GPP TS 38.213 V16.3.0 (Sep. 2020), Valbonne France, 179 pages.

3GPP, Technical Specification Group Radio Access Network, NR, "Medium Access Control (MAC) Protocol Specification (Release 15)", 3GPP TS 38.321 V15.6.0 (Jun. 2019), Valbonne France, 78 pages.

3GPP, Technical Specification Group Radio Access Network, NR, "Medium Access Control (MAC) Protocol Specification (Release 16)", 3GPP TS 38.321 V16.2.1 (Sep. 2020), Valbonne France, 154 pages.

3GPP, Technical Specification Group Radio Access Network, NR, "Requirements for Support of Radio Resource Management (Release 16)", 3GPP TS 38.133 V16.5.0 (Sep. 2020), Valbonne France, 1608 pages.

* cited by examiner

BEGIN

4610
Host computer
provides user data

4611
Host computer
executes host
application

4620
Host computer
initiates
transmission
carrying the user
data to the UE

4630
Base station
transmits the user
data

4640
UE executes client
application

END

METHODS OF HANDLING DISCONTINUOUS RECEPTION INACTIVITY TIMERS BASED ON SCELL ACTIVATION AND RELATED DEVICES AND NODES

CROSS-REFERENCE TO RELATED APPLICATIONS

This application is a 35 U.S.C. § 371 national stage application for International Application No. PCT/SE2021/050923, entitled "METHODS OF HANDLING DISCONTINUOUS RECEPTION INACTIVITY TIMERS BASED ON SCELL ACTIVATION AND RELATED DEVICES AND NODES", filed on Sep. 23, 2021, which claims priority to U.S. Provisional Application No. 63/093,064 entitled "METHODS OF HANDLING INACTIVITY TIMERS BASED ON SCELL ACTIVATION AND RELATED DEVICES AND NODES" filed on Oct. 16, 2020, assigned to the assignee hereof, the disclosures of both of which are incorporated herein by reference.

TECHNICAL FIELD

The present disclosure relates generally to communications, and more particularly to communication methods and related devices and nodes supporting wireless communications.

BACKGROUND

Carrier aggregation is a concept where the UE (User Equipment) can operate using multiple carriers (sometimes referred to as cells) that the network has available. With a greater number of carriers, more spectrum can be used by the UE and hence higher throughput can be achieved.

A UE may be configured with a subset of the cells offered by the network and the number of aggregated cells configured for one UE can change dynamically through time based on for example terminal traffic demand, type of service used by the terminal, system load etc. A cell which a terminal is configured to use is referred to as a "serving cell" for that terminal. A UE has one primary serving cell (called PCell) and zero or more secondary serving cells (SCells), where the term serving cell includes both the PCell and SCells. Which cell is a terminal's PCell is UE specific. The PCell is considered more important, and, for example, some control signaling is handled via the PCell.

In addition the concept of "configuration" of cells, the concept of "activation" has been introduced for SCells (not for the PCell). Cells may be configured (or deconfigured) using Radio Resource Control (RRC) signaling, which can be slow, and SCells can be activated (or deactivated) using a Medium Access Control (MAC) control element, which is faster. Since the activation process is based on MAC control elements, an activation/de-activation process can quickly adjust the number of activated cells to match the number that are required to fulfill a data rate needed at any given time. Activation therefore provides the possibility to keep multiple cells configured for activation on an as-needed basis.

An SCell can be activated/de-activated via: SCell Activation/Deactivation MAC CE; sCellDeactivationTimer timer; and/or RRC (re-)configuration (sCellState).

The network (NW) can only send an SCell Activation/Deactivation MAC CE on an SCell that is in Active Time (see Discontinuous Reception DRX below), i.e., otherwise that SCell is sleeping and will not receive the MAC CE.

However, in this MAC CE, the Network NW can also activate/de-activate other SCells than the SCell that receives the MAC CE.

When the SCell is de-activated, the UE is not required to transmit SRS, CSI, UL-SCH, RACH, or PUCH on that SCell, and the UE does not have to monitor PDCCH/PDSCH. When the SCell is de-activated the UE can reduce power consumption.

If the network indicates to the UE that the UE shall activate an SCell which already is in activated-state, the UE will "reactivate" the SCell. The UE will then perform certain actions, e.g. send a PHR MAC CE.

Discontinuous Reception (DRX) is discussed below.

A UE may be configured with a DRX configuration in connected mode to reduce battery consumption. When DRX is configured, the UE is only required to monitor PDCCH when the UE is in "Active Time" but when the UE is not in Active Time the UE can skip PDCCH monitoring and hence save power.

An excerpt from 3GPP TS 38.321 v15.6.0 section 5.7 which defines when the UE is considered to be in Active Time is provided below.

When a DRX cycle is configured, the Active Time includes the time while:

drx-onDurationTimer or drx-InactivityTimer or drx-RetransmissionTimerDL or drx-RetransmissionTimerUL or ra-ContentionResolutionTimer (as described in clause 5.1.5) is running; or a Scheduling Request is sent on PUCCH and is pending (as described in clause 5.4.4); or a PDCCH indicating a new transmission addressed to the C-RNTI of the MAC entity has not been received after successful reception of a Random Access Response for the Random Access Preamble not selected by the MAC entity among the contention-based Random Access Preamble (as described in clause 5.1.4).

The UE starts the drx-onDurationTimer (sometimes referred to only as onDuration or similar term) periodically and the period is referred to as the DRX cycle. Or in other words, the UE will once every DRX cycle start the onDuration timer and hence be in Active Time and monitor PDCCH. The longer the DRX cycle is the longer the UE can be "asleep" between OnDurations. And the longer the onDuration is, the longer time the UE will stay awake each DRX cycle.

However, since it is likely that if the network schedules the UE, the network may want to continue to schedule the UE for a while. Consider, for example, that the UE is downloading a file. The network would then have to wait until the UE wakes up (i.e., until the next onDuration) and then the network can start sending data to the UE. But if the onDuration is short, the network may not be able to complete the data transfer to the UE. To address this, the drx-InactivityTimer (or just "inactivity timer" or similar term) is used. The inactivity timer is started by the UE each time the UE is scheduled (i.e., the UE receives a grant to send UL data after it sends a Scheduling Request, or UE receives downlink assignment because the NW wants to send DL data). So even if the onDuration would be short, the UE starts the inactivity timer if it gets scheduled and hence the UE will stay in Active Time as long as the UE keeps on getting scheduled.

The period between OnDurations is called "DRX cycle". In other words, the UE will once per DRX cycle start the onDuration time which means that the UE will be in Active time.

During Active Time, the UE is required to monitor PDCCH, perform measurements, and report CSI. Outside Active Time, the UE is not required to perform these operations.

DRX cycles and the drx-InactivityTimer are discussed below.

A UE configured with the DRX can be configured with both a long and a short DRX cycles. The intention with the long DRX cycle is that the UE should be able to sleep a relatively long time between waking up, while in short DRX cycle the UE wakes up more frequently. These time periods that the UE is awake to listen for scheduling requests is called OnDuration periods, and is configured for a certain time duration that the UE shall be awake. The UE first drops into a short DRX cycle, where the UE is still relatively quickly reachable, but if there is not traffic for some time (i.e., when a timer called drx-ShortCycleTimer expires), the UE drops into the long DRX cycle.

When the UE is scheduled, the drx-InactivityTimer is continuously (re-)started and while this timer is running the UE is in Active Time and hence monitors PDCCH. When the drx-Inactivity Timer expires, the UE will go to short DRX sleep first, if configured, otherwise the UE will go to long DRX sleep.

If the UE has not been scheduled for a configured number of short DRX cycles the UE will start applying long DRX cycles.

Secondary DRX is discussed below.

RAN2 adopted secondary DRX where serving cells of the MAC entity can be divided into two groups, each with its own drx-InactivityTimer and onDurationTimer. This implies that the two DRX groups are in different Active Time, i.e., dependent on whether traffic is scheduled in one group or not, that DRX group will drop into sleep (DRX).

Note that in Dual Connectivity scenarios, the UE has two MAC entities and each MAC entity has its own DRX operation. However, with dual DRX the UE would have two DRX processes per MAC entity, i.e., in total four DRX processes/procedures.

Cross-carrier scheduling and self-scheduling is discussed below.

There is a feature called cross-carrier scheduling in New Radio NR. The opposite of cross-carrier scheduling is, so-called, self-scheduling. Note that in the 3GPP specifications, the terms "carrier" and "cell" are used interchangeably, so "cross-carrier scheduling" could be seen as "cross-cell scheduling", i.e., one cell scheduling another cell. Here it is described how self-scheduling and cross carrier scheduling works by using an example with a cell A and a cell B:

In self-scheduling, the scheduling for a cell is provided on the PDCCH of that cell itself:

an uplink grant received on the PDCCH of cell A is valid for a transmission on cell A, and a downlink assignment received on the PDCCH of cell A is for a downlink transmission on cell A.

In cross-carrier scheduling the scheduling for a cell is provided on the PDCCH of another cell:

an uplink grant is received on the PDCCH of cell A but that grant is valid for an uplink transmission on cell B, and a downlink assignment is received on the PDCCH of cell A but it is for a downlink transmission on cell B.

The term "scheduling cell" is used for a cell which schedules cells (schedule itself, or schedule other cells) while the term "scheduled" cell is used for a cell which gets scheduled. "To schedule" comprises providing uplink grants/downlink assignments.

SUMMARY

When a serving cell in one DRX group gets activated, the network has to wait until that serving cell enters Active Time before the network can provide scheduling for that serving cell. While the network is waiting to provide scheduling the throughput of the newly activated serving cell is reduced due to the delayed use by a communication device. Various embodiments are directed to operations and methods by a communication device and a node of a wireless communication network that may reduce the delay from when a serving cell in a group is activated until the network can provide scheduling for the serving cell. By reducing such delay, throughput can be increased since the network can more quickly schedule the newly activated serving cell.

Some embodiments of the present disclosure are directed to a method of operating a communication device that is configured with a plurality of cells to provide carrier aggregation for communication with a wireless communication network. The method includes receiving an instruction to activate a cell of the plurality of cells that are configured for the communication device, and starting a DRX inactivity timer associated with the cell of the plurality of cells responsive to receiving the instruction to active the cell of the plurality of cells.

Some other embodiments are directed to a corresponding method of operating a node of a wireless communication network in communication with a communication device, where the communication device is configured with a plurality of cells to provide carrier aggregation, and a first cell of the plurality of cells is associated with a first DRX inactivity timer having a first inactivity timer duration, and a second cell of the plurality of cells is associated with a second DRX inactivity timer having a second inactivity timer duration different than the first inactivity timer duration. The method includes transmitting an instruction to the communication device to activate the second cell that is associated with the second DRX inactivity timer, where the instruction is transmitted over the first cell associated with the first DRX inactivity timer. The method further includes transmitting scheduling information relating to the second cell for the communication device during a period defined by the second inactivity timer duration following the instruction.

Some other embodiments are directed to a corresponding communication device that includes processing circuitry and a memory coupled with the processing circuitry, wherein the memory includes instructions that when executed by the processing circuitry causes the communication device to perform operations. The operations include to receive an instruction to activate a cell of the plurality of cells that are configured for the communication device, and to start a discontinuous reception, DRX, inactivity timer associated with the cell of the plurality of cells responsive to receiving the instruction to active the cell of the plurality of cells.

Some other embodiments are directed to a corresponding radio access network (RAN) node of a wireless communication network in communication with a communication device, wherein the communication device is configured with a plurality of cells to provide carrier aggregation, wherein a first cell of the plurality of cells is associated with a first DRX inactivity timer having a first inactivity timer duration, and wherein a second cell of the plurality of cells is associated with a second DRX inactivity timer having a second inactivity timer duration different than the first inactivity timer duration. The RAN node includes processing circuitry and memory coupled with the processing circuitry, wherein the memory includes instructions that when executed by the processing circuitry causes the RAN node to perform operations. The operations include to transmit an instruction to the communication device to activate the second cell that is associated with the second DRX inactivity timer, where the instruction is transmitted over the first cell associated with the first DRX inactivity timer. The operations further include to transmit scheduling information relating to the second cell for the communication device during a period defined by the second inactivity timer duration following the instruction.

BRIEF DESCRIPTION OF THE DRAWINGS

The accompanying drawings, which are included to provide a further understanding of the disclosure and are incorporated in and constitute a part of this application, illustrate certain non-limiting embodiments of inventive concepts. In the drawings.

DETAILED DESCRIPTION

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment.

The following description presents various embodiments of the disclosed subject matter. These embodiments are presented as teaching examples and are not to be construed as limiting the scope of the disclosed subject matter. For example, certain details of the described embodiments may be modified, omitted, or expanded upon without departing from the scope of the described subject matter.

Figure 1:
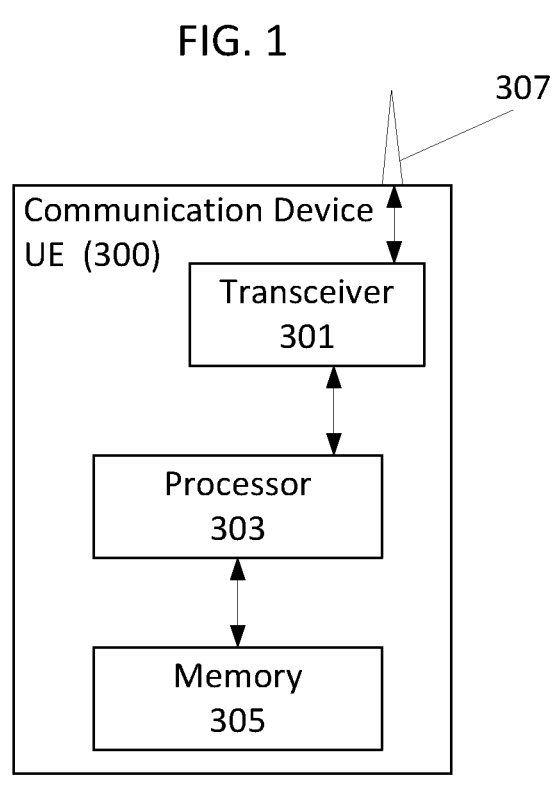
FIG. 1 is a block diagram illustrating a communication device UE according to some embodiments of inventive concepts.

FIG. 1 is a block diagram illustrating elements of a communication device UE 300 (also referred to as a mobile terminal, a mobile communication terminal, a wireless device, a wireless communication device, a wireless terminal, mobile device, a wireless communication terminal, user equipment, UE, a user equipment node/terminal/device, etc.) configured to provide wireless communication according to embodiments of inventive concepts. (Communication device 300 may be provided, for example, as discussed below with respect to wireless device 4110 of FIG. 6.) As shown, communication device UE may include an antenna 307 (e.g., corresponding to antenna 4111 of FIG. 6), and transceiver circuitry 301 (also referred to as a transceiver, e.g., corresponding to interface 4114 of FIG. 6) including a transmitter and a receiver configured to provide uplink and downlink radio communications with a base station(s) (e.g., corresponding to network node 4160 of FIG. 6, also referred to as a RAN node) of a radio access network. Communication device UE may also include processing circuitry 303 (also referred to as a processor, e.g., corresponding to processing circuitry 4120 of FIG. 6) coupled to the transceiver circuitry, and memory circuitry 305 (also referred to as memory, e.g., corresponding to device readable medium 4130 of FIG. 6) coupled to the processing circuitry. The memory circuitry 305 may include computer readable program code that when executed by the processing circuitry 303 causes the processing circuitry to perform operations according to embodiments disclosed herein. According to other embodiments, processing circuitry 303 may be defined to include memory so that separate memory circuitry is not required. Communication device UE may also include an interface (such as a user interface) coupled with processing circuitry 303, and/or communication device UE may be incorporated in a vehicle.

As discussed herein, operations of communication device UE may be performed by processing circuitry 303 and/or transceiver circuitry 301. For example, processing circuitry 303 may control transceiver circuitry 301 to transmit communications through transceiver circuitry 301 over a radio interface to a radio access network node (also referred to as a base station) and/or to receive communications through transceiver circuitry 301 from a RAN node over a radio interface. Moreover, modules may be stored in memory circuitry 305, and these modules may provide instructions so that when instructions of a module are executed by processing circuitry 303, processing circuitry 303 performs respective operations (e.g., operations discussed below with respect to Example Embodiments relating to wireless communication devices). According to some embodiments, a communication device UE 300 and/or an element(s)/function(s) thereof may be embodied as a virtual node/nodes and/or a virtual machine/machines.

Figure 2:
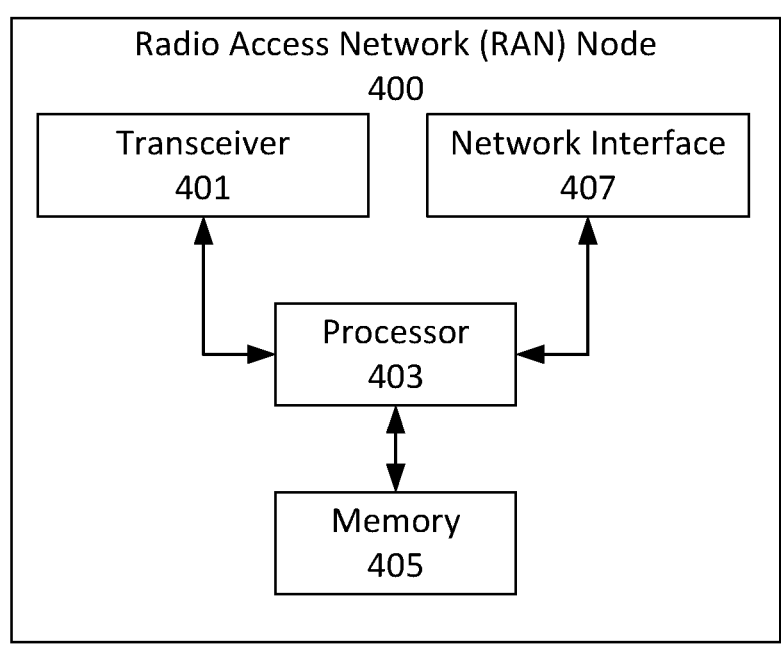
FIG. 2 is a block diagram illustrating a radio access network RAN node (e.g., a base station eNB/gNB) according to some embodiments of inventive concepts.

FIG. 2 is a block diagram illustrating elements of a radio access network RAN node 400 (also referred to as a network node, base station, eNodeB/eNB, gNodeB/gNB, etc.) of a Radio Access Network (RAN) configured to provide cellular communication according to embodiments of inventive concepts. (RAN node 400 may be provided, for example, as discussed below with respect to network node 4160 of FIG. 6.) As shown, the RAN node may include transceiver circuitry 401 (also referred to as a transceiver, e.g., corresponding to portions of interface 4190 of FIG. 6) including a transmitter and a receiver configured to provide uplink and downlink radio communications with mobile terminals. The RAN node may include network interface circuitry 407 (also referred to as a network interface, e.g., corresponding to portions of interface 4190 of FIG. 6) configured to provide communications with other nodes (e.g., with other base stations) of the RAN and/or core network CN. The network node may also include processing circuitry 403 (also referred to as a processor, e.g., corresponding to processing circuitry 4170) coupled to the transceiver circuitry, and memory circuitry 405 (also referred to as memory, e.g., corresponding to device readable medium 4180 of FIG. 6) coupled to the processing circuitry. The memory circuitry 405 may include computer readable program code that when executed by the processing circuitry 403 causes the processing circuitry to perform operations according to embodiments disclosed herein. According to other embodiments, processing circuitry 403 may be defined to include memory so that a separate memory circuitry is not required.

As discussed herein, operations of the RAN node may be performed by processing circuitry 403, network interface 407, and/or transceiver 401. For example, processing circuitry 403 may control transceiver 401 to transmit downlink communications through transceiver 401 over a radio interface to one or more mobile terminals UEs and/or to receive uplink communications through transceiver 401 from one or more mobile terminals UEs over a radio interface. Similarly, processing circuitry 403 may control network interface 407 to transmit communications through network interface 407 to one or more other network nodes and/or to receive communications through network interface from one or more other network nodes. Moreover, modules may be stored in memory 405, and these modules may provide instructions so that when instructions of a module are executed by processing circuitry 403, processing circuitry 403 performs respective operations (e.g., operations discussed below with respect to Example Embodiments relating to RAN nodes). According to some embodiments, RAN node 400 and/or an element(s)/function(s) thereof may be embodied as a virtual node/nodes and/or a virtual machine/machines.

According to some other embodiments, a network node may be implemented as a core network CN node without a transceiver. In such embodiments, transmission to a wireless communication device UE may be initiated by the network node so that transmission to the wireless communication device UE is provided through a network node including a transceiver (e.g., through a base station or RAN node). According to embodiments where the network node is a RAN node including a transceiver, initiating transmission may include transmitting through the transceiver.

Figure 3:
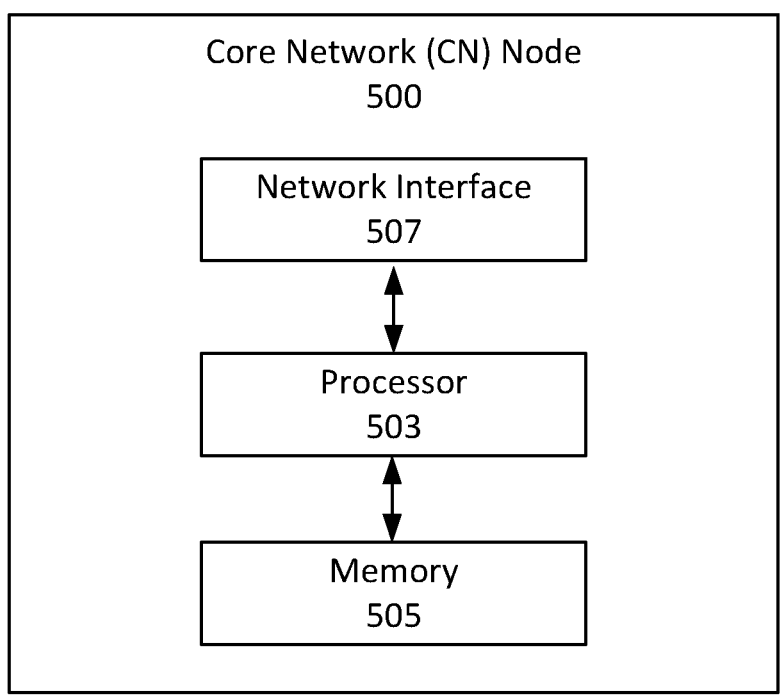
FIG. 3 is a block diagram illustrating a core network CN node (e.g., an AMF node, an SMF node, etc.) according to some embodiments of inventive concepts.

FIG. 3 is a block diagram illustrating elements of a core network CN node (e.g., an SMF node, an AMF node, etc.) of a communication network configured to provide cellular communication according to embodiments of inventive concepts. As shown, the CN node may include network interface circuitry 507 (also referred to as a network interface) configured to provide communications with other nodes of the core network and/or the radio access network RAN. The CN node may also include a processing circuitry 503 (also referred to as a processor) coupled to the network interface circuitry, and memory circuitry 505 (also referred to as memory) coupled to the processing circuitry. The memory circuitry 505 may include computer readable program code that when executed by the processing circuitry 503 causes the processing circuitry to perform operations according to embodiments disclosed herein. According to other embodiments, processing circuitry 503 may be defined to include memory so that a separate memory circuitry is not required.

As discussed herein, operations of the CN node may be performed by processing circuitry 503 and/or network interface circuitry 507. For example, processing circuitry 503 may control network interface circuitry 507 to transmit communications through network interface circuitry 507 to one or more other network nodes and/or to receive communications through network interface circuitry from one or more other network nodes. Moreover, modules may be stored in memory 505, and these modules may provide instructions so that when instructions of a module are executed by processing circuitry 503, processing circuitry 503 performs respective operations (e.g., operations discussed below with respect to Example Embodiments relating to core network nodes). According to some embodiments, CN node 500 and/or an element(s)/function(s) thereof may be embodied as a virtual node/nodes and/or a virtual machine/machines.

As explained above, when a serving cell in one DRX group gets activated, a network node has to wait until that serving cell enters Active Time before the network node can provide scheduling for that serving cell. While the network node is waiting to provide scheduling the throughput of the newly activated serving cell is reduced due to the delayed use by a communication device. Various embodiments are directed to operations and methods by a communication device and a node of a wireless communication network that may reduce the delay from when a serving cell in a group is activated until the network can provide scheduling for the serving cell. By reducing such delay, throughput can be increased since the network can more quickly schedule the newly activated serving cell.

According to some embodiments of inventive concepts, the UE starts the DRX inactivity timer associated with a DRX group when the UE activates the serving cell within the DRX group.

Potential advantages provided by various of the present embodiments may include that a delay from a serving cell in a group being activated until the network can provide scheduling for that serving cell is reduced. By reducing delay, throughput can be increased since the network can directly schedule the newly activated serving cell.

As set forth in the disclosure below, the UE performs certain actions upon activation of a serving cell. However, the UE may also take those actions when the serving cell is reactivated. As described above, reactivation refers to the case when the network indicates that a serving cell shall be activated, but that serving cell is already active. However, to simplify the language, the term "activation" should be understood to also comprise "reactivation".

The present disclosure may sometimes say that the UE monitors PDCCH "for" a serving cell and sometimes that the UE monitors PDCCH "on" a serving cell. There is a difference between "for" and "on". As described in the background, there is a concept called cross-carrier scheduling. With cross-carrier scheduling, the network can provide scheduling information for a serving cell using PDCCH on another serving cell. The serving cell which is used to provide the scheduling information is called the scheduling cell, and the cell which the scheduling information applies to is called the scheduled cell. It should not be seen as limiting that if it herein in some places says only that the UE monitors "for" a serving cell, or if it in some placed says only that the UE monitors "on" a serving cell.

The present disclosure may sometimes say that the UE will start monitoring for a serving cell in response to certain events. However, in case the UE was already monitoring for the serving cell prior to such event, the UE would continue to monitor.

Monitoring for an activated serving cell is discussed below

In some embodiments, the UE will, upon activation of a serving cell, start or continue to monitor PDCCH for (or on) the serving cell.

To "monitor PDCCH" for the serving cell can be achieved by making the UE be in "Active Time" with regards to the serving cell.

To make the serving cell be in Active Time, the UE may start a DRX inactivity timer for the serving cell where, when the DRX inactivity timer is running, the serving cell is considered to be in Active Time.

Note that when the UE, as per the above, monitors the serving cell, the UE may also monitor other serving cells, e.g., those in the same DRX group.

Delayed monitoring is discussed below.

The UE may start the monitoring for a certain period of time after the activation.

The procedure for activating serving cells can be performed by network sending to the UE an Activation/deactivation MAC CE. The UE will upon reception of this MAC CE perform the activation (or reactivation) of the serving cell. The decoding of the message may be quick, e.g. only take 8 milliseconds, while the actual activation of the serving cell may take longer, e.g., 24 or 34 milliseconds. In one embodiment, the UE triggers the action of "start or continue to monitor PDCCH of the serving cell" a certain time after the reception of the message, that certain time can be for example the time when:
   a) decoding the message (e.g. MAC CE) which activates the serving cell (e.g. 8 milliseconds after the reception of the message) is completed, or
   b) activation of the serving cell (e.g. 24 or 34 milliseconds after the reception of the message) is completed.

Cross carrier scheduling is discussed below.

In case the serving cell which is activated is scheduled by another serving cell (so called cross-carrier scheduling), the UE may start the DRX inactivity timer for another DRX group, namely the group which schedules the cell which became activated.

Consider this Example

DRX group 1: PCell (self-scheduled), SCell 1 (self-scheduled)
DRX group 2: SCell 2 (self-scheduled), SCell 3 (scheduled by SCell 1)
In this example, in one implementation of this invention the UE will:
   when SCell 2 is activated: start or continue to monitor (the DRX group of) SCell 2. This is because SCell 2 is scheduling itself (meaning that the PDCCH for SCell 2 will be sent on SCell 2), and
   when SCell 3 is activated: start or continue to monitor (the DRX group of) SCell 1. This because SCell 3 is scheduled by SCell 1 (meaning that the PDCCH for SCell 3 will be sent on SCell 1).

Conditional application of new behavior is discussed below.

In the disclosure above it has been described for example that the UE starts a DRX inactivity timer associated with a serving cell when the serving cell becomes activated. The UE may conditionally apply the behavior described above.

For example: the UE may apply the behavior if the UE is configured with DRX. If the UE is not configured with DRX the UE will not have any DRX inactivity timer to start.

For example: the UE may apply the behavior if the UE is configured with multiple DRX groups. Note, if the UE is configured with a single DRX group, the UE may start the DRX inactivity timer for other reasons, e.g., due to the reception of the message carrying the activation/deactivation MAC CE.

In some embodiments, the UE may only apply this behavior if the serving cell is activated using a certain method. For example, only due to activation based on reception of an Activation/deactivation MAC CEs. If the UE activates a serving cell for another reason, e.g. if the serving cell is activated upon configuration of the serving cell, the UE may not apply this behavior.

An indication may be provided by the UE to the network about a capability of the UE to operate as described herein.

In some embodiments, the UE indicates to the network if the UE is able to operate according to the methods described herein. For example, the UE may set a certain capability-indication to a certain value (e.g., "supported") if the UE can apply the behaviors described herein.

Network behavior is discussed below.

In the disclosure above, methods performed by the UE have been provided to initiate/continue to monitor PDCCH for a serving cell if the serving cell is activated (or reactivated).

A network may, if the network wants the UE to start monitoring a certain serving cell (or group of serving cells), send an indication to the UE to activate that serving cell, or in case the serving cell is already in activated state: reactivate the serving cell.

The network may do so in case it determines that an amount of data which should be sent from the network to the UE and/or from the UE to the network exceeding a certain threshold.

By applying this behavior, the network can "wake up" the UE in the sense that the network can indicate to the UE to activate a serving cell which will then trigger the UE to start monitoring for the serving cell.

The network may only apply this behavior if the network has determined that the UE supports the UE behavior described herein, for example, based on a capability indication sent by the UE.

Example implementations in the 3GPP specifications are provided below.

Below are two example implementation (Example 1 and Example 2) of embodiments of inventive concepts in the NR MAC specification (3GPP TS 38.321 v16.2.1). The changes (shown with bold text) show how the specification can be updated to implement some embodiments of inventive concepts.

Example 1 is provided below where Section 5.9 of 3GPP TS 38.321 v16.2.1 is modified to start the drx-Inactivity Timer associated with the SCell if the SCell Activation/Deactivation MAC CE Is received activating the SCell.

5.9 Activation/Deactivation of SCells

If the MAC entity is configured with one or more SCells, the network may activate and deactivate the configured SCells. Upon configuration of an SCell, the SCell is deactivated unless the parameter sCellState is set to activated for the SCell by upper layers.

The configured SCell(s) is activated and deactivated by:

receiving the SCell Activation/Deactivation MAC CE described in clause 6.1.3.10;

configuring sCellDeactivationTimer timer per configured SCell (except the SCell configured with PUCCH, if any): the associated SCell is deactivated upon its expiry;

configuring sCellState per configured SCell: if configured, the associated SCell is activated upon SCell configuration.

The MAC entity shall for each configured SCell:

1> if an SCell is configured with sCellState set to activated upon SCell configuration, or an SCell Activation/Deactivation MAC CE is received activating the SCell:

2> if the SCell was deactivated prior to receiving this SCell Activation/Deactivation MAC CE; or 2> if the SCell is configured with sCellState set to activated upon SCell configuration:

3> if firstActiveDownlinkBWP-Id is not set to dormant BWP:

4> activate the SCell according to the timing defined in TS 38.213 [6];

i.e. apply normal SCell operation including:

5> SRS transmissions on the SCell;

5> CSI reporting for the SCell;

5> PDCCH monitoring on the SCell;

5> PDCCH monitoring for the SCell;

5> PUCCH transmissions on the SCell, if configured.

3> else (i.e. firstActiveDownlinkBWP-Id is set to dormant BWP):

4> stop the bwp-InactivityTimer of this Serving Cell, if running.

3> activate the DL BWP and UL BWP indicated by firstActiveDownlinkBWP-Id and firstActiveUplinkBWP-Id respectively.

2> start or restart the sCellDeactivationTimer associated with the SCell according to the timing defined in TS 38.213 [6];

2> start or restart the drx-InactivityTimer associated with the SCell;

2> if the active DL BWP is not the dormant BWP:

3> (re-)initialize any suspended configured uplink grants of configured grant Type 1 associated with this SCell according to the stored configuration, if any, and to start in the symbol according to rules in clause 5.8.2.2;

3> trigger PHR according to clause 5.4.6.

1> else if an SCell Activation/Deactivation MAC CE is received deactivating the SCell; or 1> if the sCellDeactivationTimer associated with the activated SCell expires:

2> deactivate the SCell according to the timing defined in TS 38.213 [6];

2> stop the sCellDeactivationTimer associated with the SCell;

2> stop the bwp-InactivityTimer associated with the SCell;

2> deactivate any active BWP associated with the SCell;

2> clear any configured downlink assignment and any configured uplink grant Type 2 associated with the SCell respectively;

2> clear any PUSCH resource for semi-persistent CSI reporting associated with the SCell;

2> suspend any configured uplink grant Type 1 associated with the SCell;

2> flush all HARQ buffers associated with the SCell;

2> cancel, if any, triggered consistent LBT failure for the SCell.

1> if PDCCH on the activated SCell indicates an uplink grant or downlink assignment; or 1> if PDCCH on the Serving Cell scheduling the activated SCell indicates an uplink grant or a downlink assignment for the activated SCell; or 1> if a MAC PDU is transmitted in a configured uplink grant and LBT failure indication is not received from lower layers; or 1> if a MAC PDU is received in a configured downlink assignment:

1> restart the sCellDeactivationTimer associated with the SCell.

2> if the SCell is deactivated:

2> not transmit SRS on the SCell;

2> not report CSI for the SCell;

2> not transmit on UL-SCH on the SCell;

2> not transmit on RACH on the SCell;

2> not monitor the PDCCH on the SCell;

2> not monitor the PDCCH for the SCell;

2> not transmit PUCCH on the SCell.

HARQ feedback for the MAC PDU containing SCell Activation/Deactivation MAC CE shall not be impacted by PCell, PSCell and PUCCH SCell interruptions due to SCell activation/deactivation in TS 38.133 [11].

When SCell is deactivated, the ongoing Random Access procedure on the SCell, if any, is aborted.

Example 2 is provided below where Section 5.9 of 3GPP TS 38.321 v16.2.1 is modified so that if two DRX groups are configured the drx-Inactivity Timer associated with the SCell is started if the SCell Activation/Deactivation MAC CE Is received activating the SCell.

5.9 Activation/Deactivation of SCells

If the MAC entity is configured with one or more SCells, the network may activate and deactivate the configured SCells. Upon configuration of an SCell, the SCell is deactivated unless the parameter sCellState is set to activated for the SCell by upper layers.

The configured SCell(s) is activated and deactivated by:

receiving the SCell Activation/Deactivation MAC CE described in clause 6.1.3.10;

configuring sCellDeactivationTimer timer per configured SCell (except the SCell configured with PUCCH, if any): the associated SCell is deactivated upon its expiry;

configuring sCellState per configured SCell: if configured, the associated SCell is activated upon SCell configuration.

The MAC entity shall for each configured SCell:

1> if an SCell is configured with sCellState set to activated upon SCell configuration, or an SCell Activation/Deactivation MAC CE is received activating the SCell:

2> if the SCell was deactivated prior to receiving this SCell Activation/Deactivation MAC CE; or 2> if the SCell is configured with sCellState set to activated upon SCell configuration:

3> if firstActiveDownlinkBWP-Id is not set to dormant BWP:

4> activate the SCell according to the timing defined in TS 38.213 [6];

i.e. apply normal SCell operation including:

5> SRS transmissions on the SCell;

5> CSI reporting for the SCell;

5> PDCCH monitoring on the SCell;

5> PDCCH monitoring for the SCell;

5> PUCCH transmissions on the SCell, if configured.

3> else (i.e. firstActiveDownlinkBWP-Id is set to dormant BWP):

4> stop the bwp-InactivityTimer of this Serving Cell, if running.

3> activate the DL BWP and UL BWP indicated by firstActiveDownlinkBWP-Id and firstActiveUplinkBWP-Id respectively.

2> start or restart the sCellDeactivationTimer associated with the SCell according to the timing defined in TS 38.213 [6];

2> if two DRX groups are configured: start or restart the drx-InactivityTimer associated with the SCell;

2> if the active DL BWP is not the dormant BWP:

3> (re-)initialize any suspended configured uplink grants of configured grant Type 1 associated with this SCell according to the stored configuration, if any, and to start in the symbol according to rules in clause 5.8.2.2;

3> trigger PHR according to clause 5.4.6.

1> else if an SCell Activation/Deactivation MAC CE is received deactivating the SCell; or 1> if the sCellDeactivationTimer associated with the activated SCell expires:

2> deactivate the SCell according to the timing defined in TS 38.213 [6];

2> stop the sCellDeactivationTimer associated with the SCell;

2> stop the bwp-InactivityTimer associated with the SCell;

2> deactivate any active BWP associated with the SCell;

2> clear any configured downlink assignment and any configured uplink grant Type 2 associated with the SCell respectively;

2> clear any PUSCH resource for semi-persistent CSI reporting associated with the SCell;

2> suspend any configured uplink grant Type 1 associated with the SCell;

2> flush all HARQ buffers associated with the SCell;

2> cancel, if any, triggered consistent LBT failure for the SCell.

1> if PDCCH on the activated SCell indicates an uplink grant or downlink assignment; or 1> if PDCCH on the Serving Cell scheduling the activated SCell indicates an uplink grant or a downlink assignment for the activated SCell; or 1> if a MAC PDU is transmitted in a configured uplink grant and LBT failure indication is not received from lower layers; or 1> if a MAC PDU is received in a configured downlink assignment:

1> restart the sCellDeactivationTimer associated with the SCell.

2> if the SCell is deactivated:

2> not transmit SRS on the SCell;

2> not report CSI for the SCell;

2> not transmit on UL-SCH on the SCell;

2> not transmit on RACH on the SCell;

2> not monitor the PDCCH on the SCell;

2> not monitor the PDCCH for the SCell;

2> not transmit PUCCH on the SCell.

HARQ feedback for the MAC PDU containing SCell Activation/Deactivation MAC CE shall not be impacted by PCell, PSCell and PUCCH SCell interruptions due to SCell activation/deactivation in TS 38.133 [11].

When SCell is deactivated, the ongoing Random Access procedure on the SCell, if any, is aborted.

Operations of the communication device 300 (implemented using the structure of the block diagram of FIG. 1) will now be discussed with reference to the flow chart of FIG. 4 according to some embodiments of inventive concepts. For example, modules may be stored in memory 305 of FIG. 1, and these modules may provide instructions so that when the instructions of a module are executed by respective communication device processing circuitry 303, processing circuitry 303 performs respective operations of the flow chart.

Figures 4, 5:
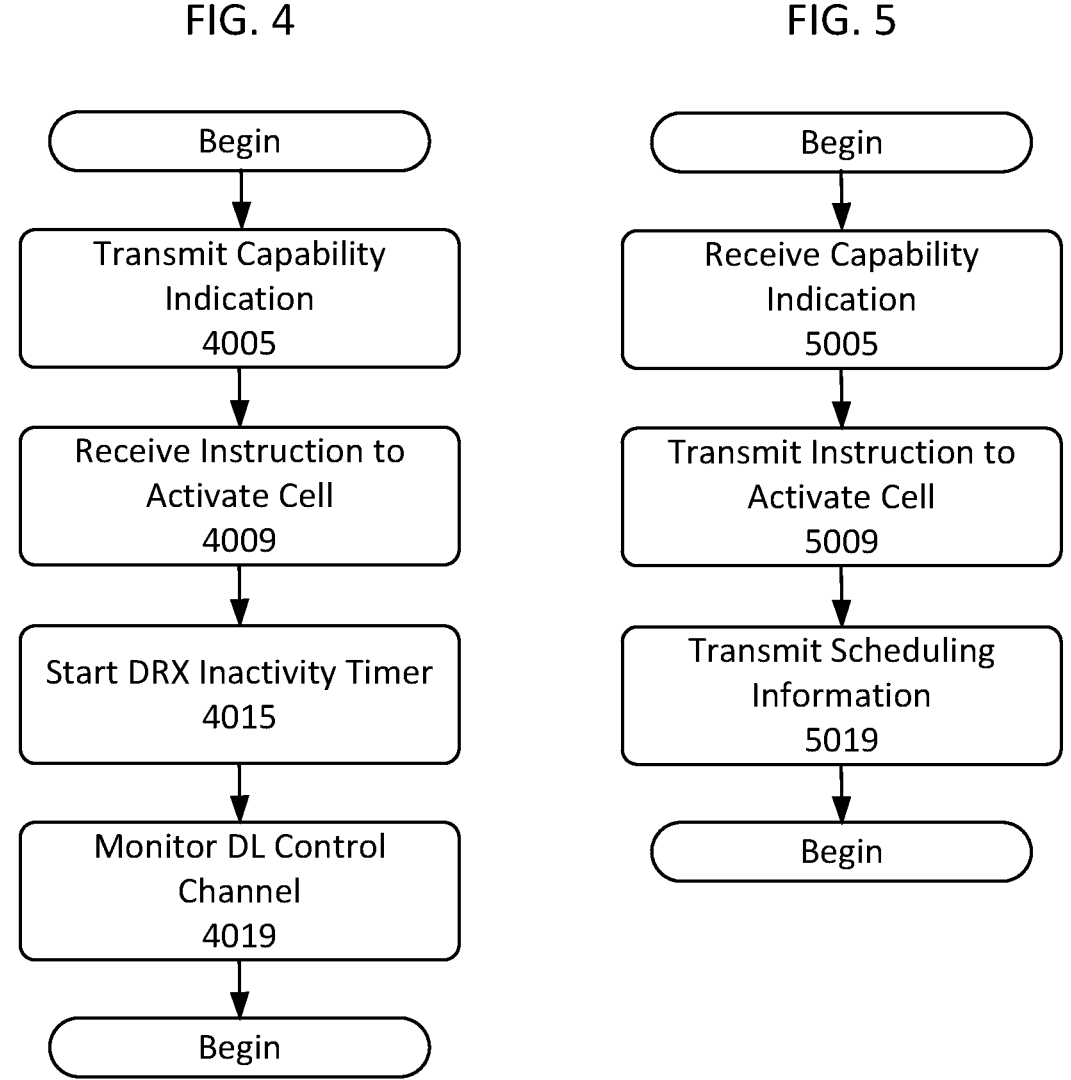
FIG. 4 is a flow chart illustrating operations of a communication device according to some embodiments of inventive concepts.
FIG. 5 is a flow chart illustrating operations of a network node according to some embodiments of inventive concepts.

In embodiments of FIG. 4, a communication device UE 300 may be configured with a plurality of cells to provide carrier aggregation for communication with a wireless communication network. For example, a first DRX inactivity timer may be associated with a first cell of the plurality of cells, and a second DRX inactivity timer may be associated with a second cell of the plurality of cells.

According to some embodiments at block 4005, processing circuitry 303 transmits (through transceiver 301) a capability indication to the wireless communication network, wherein the capability indication indicates that the communication device has a capability to monitor scheduling information relating to the second cell responsive to an activation instruction received over the first cell.

According to some embodiments at block 4009, processing circuitry 303 receives (through transceiver 301) an instruction to activate the second cell of the plurality of cells that are configured for the communication device, wherein the instruction is received over the first cell.

According to some embodiments at block 4015, processing circuitry 303 starts the second DRX inactivity timer associated with the second cell of the plurality of cells responsive to receiving the instruction to active the cell of the plurality of cells.

According to some embodiments at block 4019, processing circuitry 303 monitors a downlink control channel for scheduling information relating to the second cell of the plurality of cells over a duration of the second DRX inactivity timer defined by an inactivity timer duration after starting the DRX inactivity timer.

The downlink control channel may be monitored over another cell associated with the DRX inactivity timer different than the cell of the plurality of cells.

The downlink control channel may be monitored over the cell of the plurality of cells.

According to some embodiments, the DRX inactivity timer is running when the instruction to activate the cell is received, and wherein starting the DRX inactivity timer comprises restarting the DRX inactivity timer associated with the cell of the plurality of cells.

According to some embodiments, the operation to receive the instruction includes decoding the instruction to activate the cell of the plurality of cells, and wherein starting the DRX inactivity timer comprises starting the DRX inactivity timer responsive to decoding the instruction to activate the cell of the plurality of cells.

The UE may be configured with a DRX inactivity timer delay, and the operation for starting the DRX inactivity timer may include starting the DRX inactivity timer after passing of the DRX inactivity timer delay after receiving the instruction to activate the cell.

According to some embodiments, a first DRX inactivity timer is associated with a first cell of the plurality of cells, wherein the cell of the plurality of cells is a second cell, wherein the DRX inactivity timer associated with the cell of the plurality of cells is a second DRX inactivity timer associated with the second cell, and wherein the instruction to activate the second cell is received over the first cell.

The first cell may be associated with a first DRX process defining the first DRX inactivity timer and defining a first on duration timer, and wherein the second cell is associated with a second DRX process defining the second DRX inactivity timer and defining a second on duration timer.

In some embodiments, the durations of the first and second on duration timers are different.

In some embodiments, the durations of the first and second DRX inactivity timers are different.

According to some embodiments, the communication device transmits 4005 a capability indication to the wireless communication network, wherein the capability indication indicates that the communication device has a capability to monitor scheduling information relating to the second cell responsive to an activation instruction.

According to some embodiments, the instruction to activate the cell of the plurality of cells is received in a Medium Access Control, MAC, Control Element, CE.

Operations of communication device 300 are further discussed below with respect to Example Embodiments 1-13

Various operations from the flow chart of FIG. 4 may be optional with respect to some embodiments of communication devices and related methods. Regarding methods of example embodiment 1 (set forth below), for example, operations of blocks 4005 and/or 4019 of FIG. 4 may be optional.

Operations of a RAN node 400 (implemented using the structure of FIG. 2) will now be discussed with reference to the flow chart of FIG. 5 according to some embodiments of inventive concepts. For example, modules may be stored in memory 405 of FIG. 2, and these modules may provide instructions so that when the instructions of a module are executed by respective RAN node processing circuitry 403, processing circuitry 403 performs respective operations of the flow chart.

According to some embodiments of FIG. 5, RAN node 400 is in communication with a communication device, wherein the communication device is configured with a plurality of cells to provide carrier aggregation, wherein a first cell of the plurality of cells is associated with a first DRX inactivity timer having a first inactivity timer duration, and wherein a second cell of the plurality of cells is associated with a second DRX inactivity timer having a second inactivity timer duration different than the first inactivity timer duration.

According to some embodiments at block 5005, processing circuitry 403 receives (through transceiver 401) a capability indication from the communication device, wherein the capability indication indicates that the communication device has a capability to monitor scheduling information relating to the second cell responsive to an activation instruction.

According to some embodiments at block 5009, processing circuitry 403 transmits (through transceiver 401) an instruction to the communication device to activate the second cell that is associated with the second DRX inactivity timer, where the instruction is transmitted over the first cell associated with the first DRX inactivity timer. Moreover, the instruction may be transmitted responsive to receiving the capability indication from the communication device.

According to some embodiments at block 5019, processing circuitry 403 transmits (through transceiver 401) scheduling information relating to the second cell for the communication device during a period defined by the second DRX inactivity timer duration following the instruction.

According to some embodiments, the instruction is transmitted responsive to an amount of downlink data for the communication device exceeding a downlink threshold, and/or the operation for transmitting the scheduling information includes transmitting the scheduling information responsive to the amount of downlink data for the communication device exceeding the downlink threshold.

According to some embodiments, the instruction is transmitted responsive to an amount of uplink data for the communication device exceeding an uplink threshold, and/or the operation for transmitting the scheduling information includes transmitting the scheduling information responsive to the amount of uplink data for the communication device exceeding the uplink threshold.

According to some embodiments, the RAN node 400 receives 5005 a capability indication from the communication device, wherein the capability indication indicates that the communication device has a capability to monitor scheduling information relating to the second cell responsive to an activation instruction. The instruction is transmitted responsive to receiving the capability indication from the communication device.

According to some embodiments, the scheduling information is transmitted over a third cell of the plurality of cells, wherein the third cell is associated with the second DRX inactivity timer.

According to some embodiments, the scheduling information is over the second cell of the plurality of cells.

According to some embodiments, the UE is configured with an inactivity timer delay, and wherein the scheduling information is transmitted during the period defined by the second inactivity timer duration after passing of the inactivity timer delay after transmitting the instruction to activate the second cell.

According to some embodiments, the first cell is configured with a first DRX process defining the first DRX inactivity timer and defining a first on duration timer, wherein the second cell is configured with a second DRX process defining the second DRX inactivity timer and defining a second on duration timer, and wherein the instruction is transmitted while the communication device is asleep with respect to the second cell based on the second DRX process.

According to some embodiments, durations of the first and second on duration timers are different.

According to some embodiments, durations of the first and second DRX inactivity timers are different.

According to some embodiments, the instruction to activate the cell of the plurality of cells is transmitted in a MAC CE.

Operations of network node 400 are further discussed below with respect to Example Embodiments 14-24.

Various operations from the flow chart of FIG. 5 may be optional with respect to some embodiments of RAN nodes and related methods. Regarding methods of example embodiment 14 (set forth below), for example, operations of block 5005 of FIG. 5 may be optional.

Example embodiments are discussed below.

1. A method of operating a communication device (300), wherein the communication device is configured with a plurality of cells to provide carrier aggregation for communication with a wireless communication network, the method comprising:

receiving (4009) an instruction to activate a cell of the plurality of cells that are configured for the communication device; and starting (4015) an inactivity timer associated with scheduling for the cell of the plurality of cells responsive to receiving the instruction to active the cell of the plurality of cells.

2. The method of Embodiment 1, the method further comprising:

monitoring (4019) a downlink control channel for scheduling information relating to the cell of the plurality of cells over a duration of the inactivity timer defined by an inactivity timer duration after starting the inactivity timer.

3. The method of Embodiment 2, wherein the downlink control channel is monitored over another cell associated with the inactivity timer different than the cell of the plurality of cells.

4. The method of Embodiment 2, wherein the downlink control channel is monitored over the cell of the plurality of cells.

5. The method of any of Embodiments 1-4, wherein the inactivity timer is running when the instruction to activate the cell is received, and wherein starting the inactivity timer comprises restarting the inactivity timer associated with scheduling for the cell of the plurality of cells.

6. The method of any of Embodiments 1-5, wherein receiving the instruction comprises decoding the instruction to activate the cell of the plurality of cells, and wherein starting the inactivity timer comprises starting the inactivity timer responsive to decoding the instruction to activate the cell of the plurality of cells.

7. The method of Embodiment 6, wherein the UE is configured with an inactivity timer delay, and wherein starting the inactivity timer comprises starting the inactivity timer after passing of the inactivity timer delay after receiving the instruction to activate the cell.

8. The method of any of Embodiments 1-7, wherein a first inactivity timer is associated with a first cell of the plurality of cells, wherein the cell of the plurality of cells is a second cell, wherein the inactivity timer associated with scheduling for the cell of the plurality of cells is a second inactivity timer associated with the second cell, and wherein the instruction to activate the second cell is received over the first cell.

9. The method of Embodiment 8, wherein the first cell is associated with a first discontinuous reception, DRX, process defining the first inactivity timer and defining a first on duration timer, and wherein the second cell is associated with a second DRX process defining the second inactivity timer and defining a second on duration timer.

10. The method of Embodiment 9, wherein durations of the first and second on duration timers are different.

11. The method of any of Embodiments 8-10, wherein durations of the first and second inactivity timers are different.

12. The method of any of Embodiments 8-11 further comprising:

transmitting (4005) a capability indication to the wireless communication network, wherein the capability indication indicates that the communication device has a capability to monitor scheduling information relating to the second cell responsive to an activation instruction.

13. The method of any of Embodiments 1-12, wherein the instruction to activate the cell of the plurality of cells is received in a Medium Access Control, MAC, Control Element, CE.

14. A method of operating a node of a wireless communication network in communication with a communication device, wherein the communication device is configured with a plurality of cells to provide carrier aggregation, wherein a first cell of the plurality of cells is associated with a first inactivity timer having a first inactivity timer duration, and wherein a second cell of the plurality of cells is associated with a second inactivity timer having a second inactivity timer duration different than the first inactivity timer duration, the method comprising:

transmitting (5009) an instruction to the communication device to activate the second cell that is associated with the second inactivity timer, where the instruction is transmitted over the first cell associated with the first inactivity timer; and transmitting (5019) scheduling information relating to the second cell for the communication device during a period defined by the second inactivity timer duration following the instruction.

15. The method of Embodiment 14, wherein the instruction is transmitted responsive to an amount of downlink data for the communication device exceeding a downlink threshold, and/or wherein transmitting the scheduling information comprises transmitting the scheduling information responsive to the amount of downlink data for the communication device exceeding the downlink threshold.

16. The method of any of Embodiments 14-15, wherein the instruction is transmitted responsive to an amount of uplink data for the communication device exceeding an uplink threshold, and/or wherein transmitting the scheduling information comprises transmitting the scheduling information responsive to the amount of uplink data for the communication device exceeding the uplink threshold.

17. The method of any of Embodiments 14-16 further comprising:

receiving (5005) a capability indication from the communication device, wherein the capability indication indicates that the communication device has a capability to monitor scheduling information relating to the second cell responsive to an activation instruction;

wherein the instruction is transmitted responsive to receiving the capability indication from the communication device.

18. The method of any of Embodiments 14-17, wherein the scheduling information is transmitted over a third cell of the plurality of cells, wherein the third cell is associated with the second inactivity timer.

19. The method of any of Embodiments 14-17, wherein the scheduling information is over the second cell of the plurality of cells.

20. The method of any of Embodiments 14-19, wherein the UE is configured with an inactivity timer delay, and wherein the scheduling information is transmitted during the period defined by the second inactivity timer duration after passing of the inactivity timer delay after transmitting the instruction to activate the second cell.

21. The method of any of Embodiments 14-20, wherein the first cell is configured with a first discontinuous reception, DRX, process defining the first inactivity timer and defining a first on duration timer, wherein the second cell is configured with a second DRX process defining the second inactivity timer and defining a second on duration timer, and wherein the instruction is transmitted while the communication device is asleep with respect to the second cell based on the second DRX process.

22. The method of Embodiment 21, wherein durations of the first and second on duration timers are different.

23. The method of any of Embodiments 14-22, wherein durations of the first and second inactivity timers are different.

24. The method of any of Embodiments 14-23, wherein the instruction to activate the cell of the plurality of cells is transmitted in a Medium Access Control, MAC, Control Element, CE.

25. A communication device (300) comprising:
processing circuitry (303); and
memory (305) coupled with the processing circuitry, wherein the memory includes instructions that when executed by the processing circuitry causes the communication device to perform operations according to any of Embodiments 1-13.

26. A communication device (300) adapted to perform according to any of Embodiments 1-13.

27. A computer program comprising program code to be executed by processing circuitry (303) of a communication device (300), whereby execution of the program code causes the communication device (300) to perform operations according to any of embodiments 1-13.

28. A computer program product comprising a non-transitory storage medium including program code to be executed by processing circuitry (303) of a communication device (300), whereby execution of the program code causes the communication device (300) to perform operations according to any of embodiments 1-13.

29. A radio access network, RAN, node (400) comprising:
processing circuitry (403); and
memory (405) coupled with the processing circuitry, wherein the memory includes instructions that when executed by the processing circuitry causes the RAN node to perform operations according to any of Embodiments 14-24.

30. A radio access network, RAN, node (400) adapted to perform according to any of Embodiments 14-24.

31. A computer program comprising program code to be executed by processing circuitry (403) of a radio access network, RAN, node (400), whereby execution of the program code causes the RAN node (400) to perform operations according to any of embodiments 14-24.

32. A computer program product comprising a non-transitory storage medium including program code to be executed by processing circuitry (403) of a radio access network, RAN, node (400), whereby execution of the program code causes the RAN node (400) to perform operations according to any of embodiments 14-24.

Explanations are provided below for various abbreviations/acronyms used in the present disclosure.

Abbreviation Explanation
CSI Channel State Information
C-RNTI Cell Radio Network Temporary Identifier
DL Downlink
DRX Discontinuous reception
eNB Base station supporting LTE air interface
gNB Base station supporting the NR air interface
LTE Long Term Evolution
MAC Medium Access Control
MAC CE MAC Control Element
NR New Radio NW Network
PCell Primary serving cell
PDCCH Physical Downlink Control Channel
PDSCH Physical Downlink Shared Channel
PHR Power headroom
RACH Random Access Channel
RRC Radio Resource Control
SCell Secondary serving cell
SRS Sounding Reference Signals
UE User Equipment
UL Uplink
UL-SCH Uplink Additional explanation is provided below.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Figure 6:
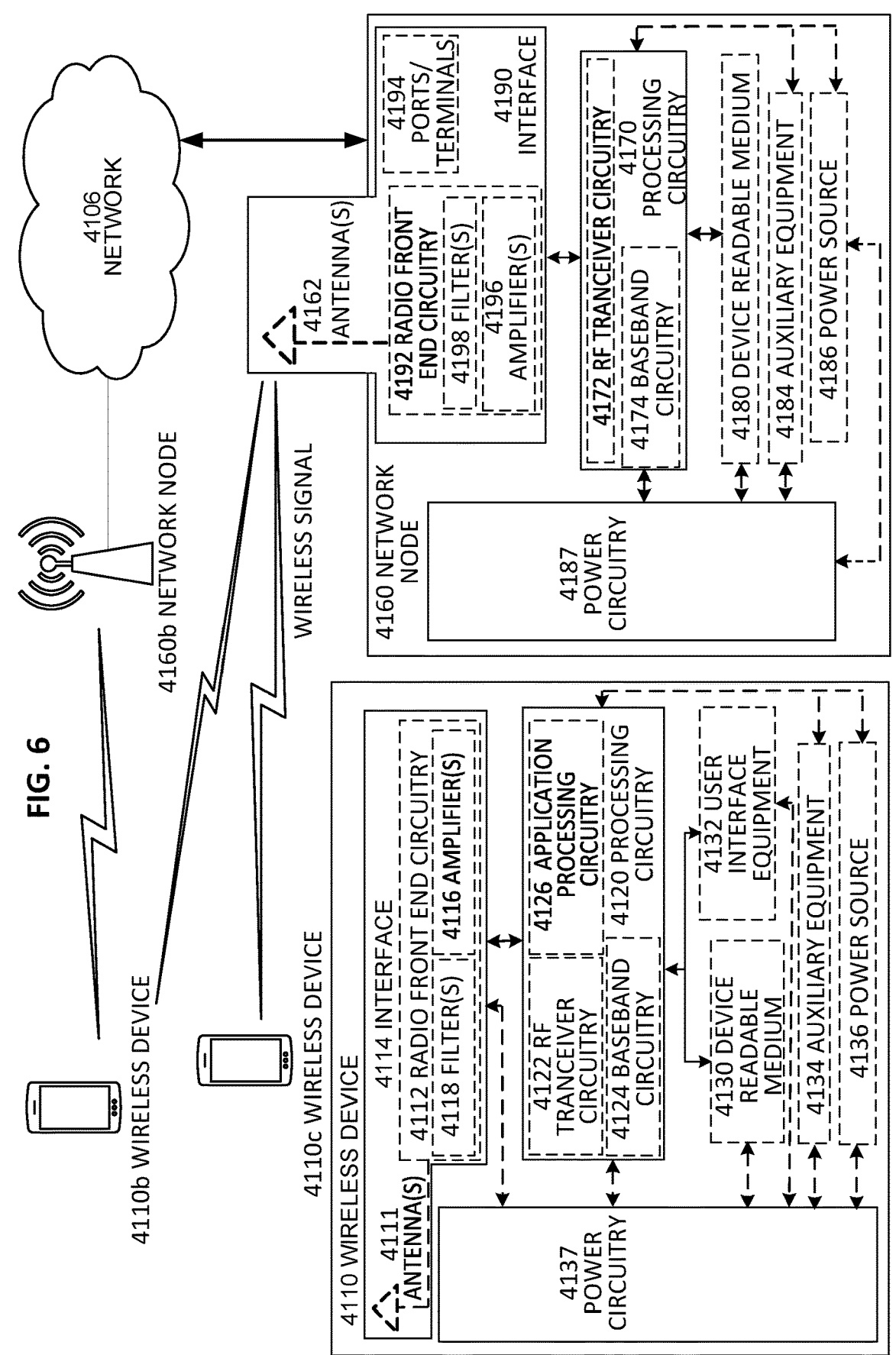
FIG. 6 is a block diagram of a wireless network in accordance with some embodiments.

FIG. 6 illustrates a wireless network in accordance with some embodiments.

Although the subject matter described herein may be implemented in any appropriate type of system using any suitable components, the embodiments disclosed herein are described in relation to a wireless network, such as the example wireless network illustrated in FIG. 6. For simplicity, the wireless network of FIG. 6 only depicts network 4106, network nodes 4160 and 4160*b*, and WDs 4110, 4110*b*, and 4110*c* (also referred to as mobile terminals). In practice, a wireless network may further include any additional elements suitable to support communication between wireless devices or between a wireless device and another communication device, such as a landline telephone, a service provider, or any other network node or end device. Of the illustrated components, network node 4160 and wireless device (WD) 4110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 4106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 4160 and WD 4110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 6, network node 4160 includes processing circuitry 4170, device readable medium 4180, communication interface 4190, auxiliary equipment 4184 (e.g., display device, user input interface, etc.), power source 4186, power circuitry 4187, and antenna 4162. Although network node 4160 illustrated in the example wireless network of FIG. 6 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 4160 are depicted as single boxes located within a larger box, or nested within multiple boxes, in practice, a network node may comprise multiple different physical components that make up a single illustrated component (e.g., device readable medium 4180 may comprise multiple separate hard drives as well as multiple RAM modules).

Similarly, network node 4160 may be composed of multiple physically separate components (e.g., a NodeB component and a RNC component, or a BTS component and a BSC component, etc.), which may each have their own respective components. In certain scenarios in which network node 4160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 4160 may be configured to support multiple radio access technologies (RATs). In such embodiments, some components may be duplicated (e.g., separate device readable medium 4180 for the different RATs) and some components may be reused (e.g., the same antenna 4162 may be shared by the RATs). Network node 4160 may also include multiple sets of the various illustrated components for different wireless technologies integrated into network node 4160, such as, for example, GSM, WCDMA, LTE, NR, WiFi, or Bluetooth wireless technologies. These wireless technologies may be integrated into the same or different chip or set of chips and other components within network node 4160.

Processing circuitry 4170 is configured to perform any determining, calculating, or similar operations (e.g., certain obtaining operations) described herein as being provided by a network node. These operations performed by processing circuitry 4170 may include processing information obtained by processing circuitry 4170 by, for example, converting the obtained information into other information, comparing the obtained information or converted information to information stored in the network node, and/or performing one or more operations based on the obtained information or converted information, and as a result of said processing making a determination.

Processing circuitry 4170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 4160 components, such as device readable medium 4180, network node 4160 functionality. For example, processing circuitry 4170 may execute instructions stored in device readable medium 4180 or in memory within processing circuitry 4170. Such functionality may include providing any of the various wireless features, functions, or benefits discussed herein. In some embodiments, processing circuitry 4170 may include a system on a chip (SOC).

In some embodiments, processing circuitry 4170 may include one or more of radio frequency (RF) transceiver circuitry 4172 and baseband processing circuitry 4174. In some embodiments, radio frequency (RF) transceiver circuitry 4172 and baseband processing circuitry 4174 may be on separate chips (or sets of chips), boards, or units, such as radio units and digital units. In alternative embodiments, part or all of RF transceiver circuitry 4172 and baseband processing circuitry 4174 may be on the same chip or set of chips, boards, or units In certain embodiments, some or all of the functionality described herein as being provided by a network node, base station, eNB or other such network device may be performed by processing circuitry 4170 executing instructions stored on device readable medium 4180 or memory within processing circuitry 4170. In alternative embodiments, some or all of the functionality may be provided by processing circuitry 4170 without executing instructions stored on a separate or discrete device readable medium, such as in a hard-wired manner. In any of those embodiments, whether executing instructions stored on a device readable storage medium or not, processing circuitry 4170 can be configured to perform the described functionality. The benefits provided by such functionality are not limited to processing circuitry 4170 alone or to other components of network node 4160, but are enjoyed by network node 4160 as a whole, and/or by end users and the wireless network generally.

Device readable medium 4180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 4170. Device readable medium 4180 may store any suitable instructions, data or information, including a computer program, software, an application including one or more of logic, rules, code, tables, etc. and/or other instructions capable of being executed by processing circuitry 4170 and, utilized by network node 4160. Device readable medium 4180 may be used to store any calculations made by processing circuitry 4170 and/or any data received via interface 4190. In some embodiments, processing circuitry 4170 and device readable medium 4180 may be considered to be integrated.

Interface 4190 is used in the wired or wireless communication of signalling and/or data between network node 4160, network 4106, and/or WDs 4110. As illustrated, interface 4190 comprises port(s)/terminal(s) 4194 to send and receive data, for example to and from network 4106 over a wired connection. Interface 4190 also includes radio front end circuitry 4192 that may be coupled to, or in certain embodiments a part of, antenna 4162. Radio front end circuitry 4192 comprises filters 4198 and amplifiers 4196. Radio front end circuitry 4192 may be connected to antenna 4162 and processing circuitry 4170. Radio front end circuitry may be configured to condition signals communicated between antenna 4162 and processing circuitry 4170. Radio front end circuitry 4192 may receive digital data that is to be sent out to other network nodes or WDs via a wireless connection. Radio front end circuitry 4192 may convert the digital data into a radio signal having the appropriate channel and bandwidth parameters using a combination of filters 4198 and/or amplifiers 4196. The radio signal may then be transmitted via antenna 4162. Similarly, when receiving data, antenna 4162 may collect radio signals which are then converted into digital data by radio front end circuitry 4192. The digital data may be passed to processing circuitry 4170. In other embodiments, the interface may comprise different components and/or different combinations of components.

In certain alternative embodiments, network node 4160 may not include separate radio front end circuitry 4192, instead, processing circuitry 4170 may comprise radio front end circuitry and may be connected to antenna 4162 without separate radio front end circuitry 4192. Similarly, in some embodiments, all or some of RF transceiver circuitry 4172 may be considered a part of interface 4190. In still other embodiments, interface 4190 may include one or more ports or terminals 4194, radio front end circuitry 4192, and RF transceiver circuitry 4172, as part of a radio unit (not shown), and interface 4190 may communicate with baseband processing circuitry 4174, which is part of a digital unit (not shown).

Antenna 4162 may include one or more antennas, or antenna arrays, configured to send and/or receive wireless signals. Antenna 4162 may be coupled to radio front end circuitry 4192 and may be any type of antenna capable of transmitting and receiving data and/or signals wirelessly. In some embodiments, antenna 4162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 4162 may be separate from network node 4160 and may be connectable to network node 4160 through an interface or port.

Antenna 4162, interface 4190, and/or processing circuitry 4170 may be configured to perform any receiving operations and/or certain obtaining operations described herein as being performed by a network node. Any information, data and/or signals may be received from a wireless device, another network node and/or any other network equipment. Similarly, antenna 4162, interface 4190, and/or processing circuitry 4170 may be configured to perform any transmitting operations described herein as being performed by a network node. Any information, data and/or signals may be transmitted to a wireless device, another network node and/or any other network equipment.

Power circuitry 4187 may comprise, or be coupled to, power management circuitry and is configured to supply the components of network node 4160 with power for performing the functionality described herein. Power circuitry 4187 may receive power from power source 4186. Power source 4186 and/or power circuitry 4187 may be configured to provide power to the various components of network node 4160 in a form suitable for the respective components (e.g., at a voltage and current level needed for each respective component). Power source 4186 may either be included in, or external to, power circuitry 4187 and/or network node 4160. For example, network node 4160 may be connectable to an external power source (e.g., an electricity outlet) via an input circuitry or interface such as an electrical cable, whereby the external power source supplies power to power circuitry 4187. As a further example, power source 4186 may comprise a source of power in the form of a battery or battery pack which is connected to, or integrated in, power circuitry 4187. The battery may provide backup power should the external power source fail. Other types of power sources, such as photovoltaic devices, may also be used.

Alternative embodiments of network node 4160 may include additional components beyond those shown in FIG. 6 that may be responsible for providing certain aspects of the network node's functionality, including any of the functionality described herein and/or any functionality necessary to support the subject matter described herein. For example, network node 4160 may include user interface equipment to allow input of information into network node 4160 and to allow output of information from network node 4160. This may allow a user to perform diagnostic, maintenance, repair, and other administrative functions for network node 4160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 4110 includes antenna 4111, interface 4114, processing circuitry 4120, device readable medium 4130, user interface equipment 4132, auxiliary equipment 4134, power source 4136 and power circuitry 4137. WD 4110 may include multiple sets of one or more of the illustrated components for different wireless technologies supported by WD 4110, such as, for example, GSM, WCDMA, LTE, NR, WiFi, WiMAX, or Bluetooth wireless technologies, just to mention a few. These wireless technologies may be integrated into the same or different chips or set of chips as other components within WD 4110.

Antenna 4111 may include one or more antennas or antenna arrays, configured to send and/or receive wireless signals, and is connected to interface 4114. In certain alternative embodiments, antenna 4111 may be separate from WD 4110 and be connectable to WD 4110 through an interface or port. Antenna 4111, interface 4114, and/or processing circuitry 4120 may be configured to perform any receiving or transmitting operations described herein as being performed by a WD. Any information, data and/or signals may be received from a network node and/or another WD. In some embodiments, radio front end circuitry and/or antenna 4111 may be considered an interface.

As illustrated, interface 4114 comprises radio front end circuitry 4112 and antenna 4111. Radio front end circuitry 4112 comprise one or more filters 4118 and amplifiers 4116. Radio front end circuitry 4112 is connected to antenna 4111 and processing circuitry 4120, and is configured to condition signals communicated between antenna 4111 and processing circuitry 4120. Radio front end circuitry 4112 may be coupled to or a part of antenna 4111. In some embodiments, WD 4110 may not include separate radio front end circuitry 4112; rather, processing circuitry 4120 may comprise radio front end circuitry and may be connected to antenna 4111. Similarly, in some embodiments, some or all of RF transceiver circuitry 4122 may be considered a part of interface 4114. Radio front end circuitry 4112 may receive digital data that is to be sent out to other network nodes or WDs via a wireless connection. Radio front end circuitry 4112 may convert the digital data into a radio signal having the appropriate channel and bandwidth parameters using a combination of filters 4118 and/or amplifiers 4116. The radio signal may then be transmitted via antenna 4111. Similarly, when receiving data, antenna 4111 may collect radio signals which are then converted into digital data by radio front end circuitry 4112. The digital data may be passed to processing circuitry 4120. In other embodiments, the interface may comprise different components and/or different combinations of components.

Processing circuitry 4120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 4110 components, such as device readable medium 4130, WD 4110 functionality. Such functionality may include providing any of the various wireless features or benefits discussed herein. For example, processing circuitry 4120 may execute instructions stored in device readable medium 4130 or in memory within processing circuitry 4120 to provide the functionality disclosed herein.

As illustrated, processing circuitry 4120 includes one or more of RF transceiver circuitry 4122, baseband processing circuitry 4124, and application processing circuitry 4126. In other embodiments, the processing circuitry may comprise different components and/or different combinations of components. In certain embodiments processing circuitry 4120 of WD 4110 may comprise a SOC. In some embodiments, RF transceiver circuitry 4122, baseband processing circuitry 4124, and application processing circuitry 4126 may be on separate chips or sets of chips. In alternative embodiments, part or all of baseband processing circuitry 4124 and application processing circuitry 4126 may be combined into one chip or set of chips, and RF transceiver circuitry 4122 may be on a separate chip or set of chips. In still alternative embodiments, part or all of RF transceiver circuitry 4122 and baseband processing circuitry 4124 may be on the same chip or set of chips, and application processing circuitry 4126 may be on a separate chip or set of chips. In yet other alternative embodiments, part or all of RF transceiver circuitry 4122, baseband processing circuitry 4124, and application processing circuitry 4126 may be combined in the same chip or set of chips. In some embodiments, RF transceiver circuitry 4122 may be a part of interface 4114. RF transceiver circuitry 4122 may condition RF signals for processing circuitry 4120.

In certain embodiments, some or all of the functionality described herein as being performed by a WD may be provided by processing circuitry 4120 executing instructions stored on device readable medium 4130, which in certain embodiments may be a computer-readable storage medium. In alternative embodiments, some or all of the functionality may be provided by processing circuitry 4120 without executing instructions stored on a separate or discrete device readable storage medium, such as in a hard-wired manner. In any of those particular embodiments, whether executing instructions stored on a device readable storage medium or not, processing circuitry 4120 can be configured to perform the described functionality. The benefits provided by such functionality are not limited to processing circuitry 4120 alone or to other components of WD 4110, but are enjoyed by WD 4110 as a whole, and/or by end users and the wireless network generally.

Processing circuitry 4120 may be configured to perform any determining, calculating, or similar operations (e.g., certain obtaining operations) described herein as being performed by a WD. These operations, as performed by processing circuitry 4120, may include processing information obtained by processing circuitry 4120 by, for example, converting the obtained information into other information, comparing the obtained information or converted information to information stored by WD 4110, and/or performing one or more operations based on the obtained information or converted information, and as a result of said processing making a determination.

Device readable medium 4130 may be operable to store a computer program, software, an application including one or more of logic, rules, code, tables, etc. and/or other instructions capable of being executed by processing circuitry 4120. Device readable medium 4130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 4120. In some embodiments, processing circuitry 4120 and device readable medium 4130 may be considered to be integrated.

User interface equipment 4132 may provide components that allow for a human user to interact with WD 4110. Such interaction may be of many forms, such as visual, audial, tactile, etc. User interface equipment 4132 may be operable to produce output to the user and to allow the user to provide input to WD 4110. The type of interaction may vary depending on the type of user interface equipment 4132 installed in WD 4110. For example, if WD 4110 is a smart phone, the interaction may be via a touch screen; if WD 4110 is a smart meter, the interaction may be through a screen that provides usage (e.g., the number of gallons used) or a speaker that provides an audible alert (e.g., if smoke is detected). User interface equipment 4132 may include input interfaces, devices and circuits, and output interfaces, devices and circuits. User interface equipment 4132 is configured to allow input of information into WD 4110, and is connected to processing circuitry 4120 to allow processing circuitry 4120 to process the input information. User interface equipment 4132 may include, for example, a microphone, a proximity or other sensor, keys/buttons, a touch display, one or more cameras, a USB port, or other input circuitry. User interface equipment 4132 is also configured to allow output of information from WD 4110, and to allow processing circuitry 4120 to output information from WD 4110. User interface equipment 4132 may include, for example, a speaker, a display, vibrating circuitry, a USB port, a head-phone interface, or other output circuitry. Using one or more input and output interfaces, devices, and circuits, of user interface equipment 4132, WD 4110 may communicate with end users and/or the wireless network, and allow them to benefit from the functionality described herein.

Auxiliary equipment 4134 is operable to provide more specific functionality which may not be generally performed by WDs. This may comprise specialized sensors for doing measurements for various purposes, interfaces for additional types of communication such as wired communications etc. The inclusion and type of components of auxiliary equipment 4134 may vary depending on the embodiment and/or scenario.

Power source 4136 may, in some embodiments, be in the form of a battery or battery pack. Other types of power sources, such as an external power source (e.g., an electricity outlet), photovoltaic devices or power cells, may also be used. WD 4110 may further comprise power circuitry 4137 for delivering power from power source 4136 to the various parts of WD 4110 which need power from power source 4136 to carry out any functionality described or indicated herein. Power circuitry 4137 may in certain embodiments comprise power management circuitry. Power circuitry 4137 may additionally or alternatively be operable to receive power from an external power source; in which case WD 4110 may be connectable to the external power source (such as an electricity outlet) via input circuitry or an interface such as an electrical power cable. Power circuitry 4137 may also in certain embodiments be operable to deliver power from an external power source to power source 4136. This may be, for example, for the charging of power source 4136. Power circuitry 4137 may perform any formatting, converting, or other modification to the power from power source 4136 to make the power suitable for the respective components of WD 4110 to which power is supplied.

Figure 7:
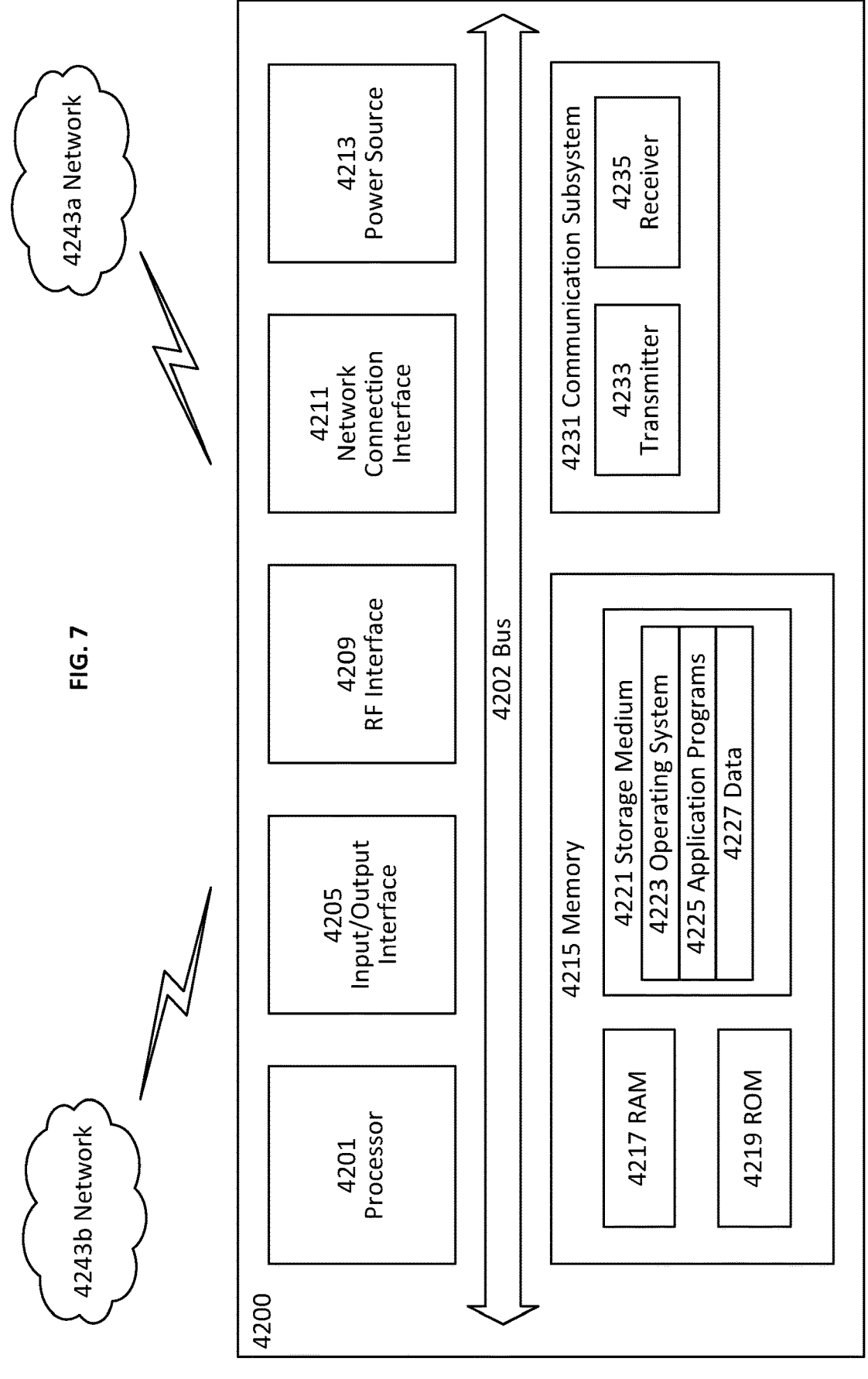
FIG. 7 is a block diagram of a user equipment in accordance with some embodiments

FIG. 7 illustrates a user Equipment in accordance with some embodiments.

FIG. 7 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 42200 may be any UE identified by the 3rd Generation Partnership Project (3GPP), including a NB-IoT UE, a machine type communication (MTC) UE, and/or an enhanced MTC (eMTC) UE. UE 4200, as illustrated in FIG. 7, is one example of a WD configured for communication in accordance with one or more communication standards promulgated by the 3rd Generation Partnership Project (3GPP), such as 3GPP's GSM, UMTS, LTE, and/or 5G standards. As mentioned previously, the term WD and UE may be used interchangeable. Accordingly, although FIG. 7 is a UE, the components discussed herein are equally applicable to a WD, and vice-versa.

In FIG. 7, UE 4200 includes processing circuitry 4201 that is operatively coupled to input/output interface 4205, radio frequency (RF) interface 4209, network connection interface 4211, memory 4215 including random access memory (RAM) 4217, read-only memory (ROM) 4219, and storage medium 4221 or the like, communication subsystem 4231, power source 4213, and/or any other component, or any combination thereof. Storage medium 4221 includes operating system 4223, application program 4225, and data 4227. In other embodiments, storage medium 4221 may include other similar types of information. Certain UEs may utilize all of the components shown in FIG. 7, or only a subset of the components. The level of integration between the components may vary from one UE to another UE. Further, certain UEs may contain multiple instances of a component, such as multiple processors, memories, transceivers, transmitters, receivers, etc.

In FIG. 7, processing circuitry 4201 may be configured to process computer instructions and data. Processing circuitry 4201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 4201 may include two central processing units (CPUs). Data may be information in a form suitable for use by a computer.

In the depicted embodiment, input/output interface 4205 may be configured to provide a communication interface to an input device, output device, or input and output device. UE 4200 may be configured to use an output device via input/output interface 4205. An output device may use the same type of interface port as an input device. For example, a USB port may be used to provide input to and output from UE 4200. The output device may be a speaker, a sound card, a video card, a display, a monitor, a printer, an actuator, an emitter, a smartcard, another output device, or any combination thereof. UE 4200 may be configured to use an input device via input/output interface 4205 to allow a user to capture information into UE 4200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 7, RF interface 4209 may be configured to provide a communication interface to RF components such as a transmitter, a receiver, and an antenna. Network connection interface 4211 may be configured to provide a communication interface to network 4243*a*. Network 4243*a* may encompass wired and/or wireless networks such as a local-area network (LAN), a wide-area network (WAN), a computer network, a wireless network, a telecommunications network, another like network or any combination thereof. For example, network 4243*a* may comprise a Wi-Fi network. Network connection interface 4211 may be configured to include a receiver and a transmitter interface used to communicate with one or more other devices over a communication network according to one or more communication protocols, such as Ethernet, TCP/IP, SONET, ATM, or the like. Network connection interface 4211 may implement receiver and transmitter functionality appropriate to the communication network links (e.g., optical, electrical, and the like). The transmitter and receiver functions may share circuit components, software or firmware, or alternatively may be implemented separately.

RAM 4217 may be configured to interface via bus 4202 to processing circuitry 4201 to provide storage or caching of data or computer instructions during the execution of software programs such as the operating system, application programs, and device drivers. ROM 4219 may be configured to provide computer instructions or data to processing circuitry 4201. For example, ROM 4219 may be configured to store invariant low-level system code or data for basic system functions such as basic input and output (I/O), startup, or reception of keystrokes from a keyboard that are stored in a non-volatile memory. Storage medium 4221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 4221 may be configured to include operating system 4223, application program 4225 such as a web browser application, a widget or gadget engine or another application, and data file 4227. Storage medium 4221 may store, for use by UE 4200, any of a variety of various operating systems or combinations of operating systems.

Storage medium 4221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 4221 may allow UE 4200 to access computer-executable instructions, application programs or the like, stored on transitory or non-transitory memory media, to off-load data, or to upload data. An article of manufacture, such as one utilizing a communication system may be tangibly embodied in storage medium 4221, which may comprise a device readable medium.

In FIG. 7, processing circuitry 4201 may be configured to communicate with network 4243b using communication subsystem 4231. Network 4243a and network 4243b may be the same network or networks or different network or networks. Communication subsystem 4231 may be configured to include one or more transceivers used to communicate with network 4243b. For example, communication subsystem 4231 may be configured to include one or more transceivers used to communicate with one or more remote transceivers of another device capable of wireless communication such as another WD, UE, or base station of a radio access network (RAN) according to one or more communication protocols, such as IEEE 802.11, CDMA, WCDMA, GSM, LTE, UTRAN, WiMax, or the like. Each transceiver may include transmitter 4233 and/or receiver 4235 to implement transmitter or receiver functionality, respectively, appropriate to the RAN links (e.g., frequency allocations and the like). Further, transmitter 4233 and receiver 4235 of each transceiver may share circuit components, software or firmware, or alternatively may be implemented separately.

In the illustrated embodiment, the communication functions of communication subsystem 4231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 4231 may include cellular communication, Wi-Fi communication, Bluetooth communication, and GPS communication. Network 4243b may encompass wired and/or wireless networks such as a local-area network (LAN), a wide-area network (WAN), a computer network, a wireless network, a telecommunications network, another like network or any combination thereof. For example, network 4243b may be a cellular network, a Wi-Fi network, and/or a near-field network. Power source 4213 may be configured to provide alternating current (AC) or direct current (DC) power to components of UE 4200.

The features, benefits and/or functions described herein may be implemented in one of the components of UE 4200 or partitioned across multiple components of UE 4200. Further, the features, benefits, and/or functions described herein may be implemented in any combination of hardware, software or firmware. In one example, communication subsystem 4231 may be configured to include any of the components described herein. Further, processing circuitry 4201 may be configured to communicate with any of such components over bus 4202. In another example, any of such components may be represented by program instructions stored in memory that when executed by processing circuitry 4201 perform the corresponding functions described herein. In another example, the functionality of any of such components may be partitioned between processing circuitry 4201 and communication subsystem 4231. In another example, the non-computationally intensive functions of any of such components may be implemented in software or firmware and the computationally intensive functions may be implemented in hardware.

Figure 8:
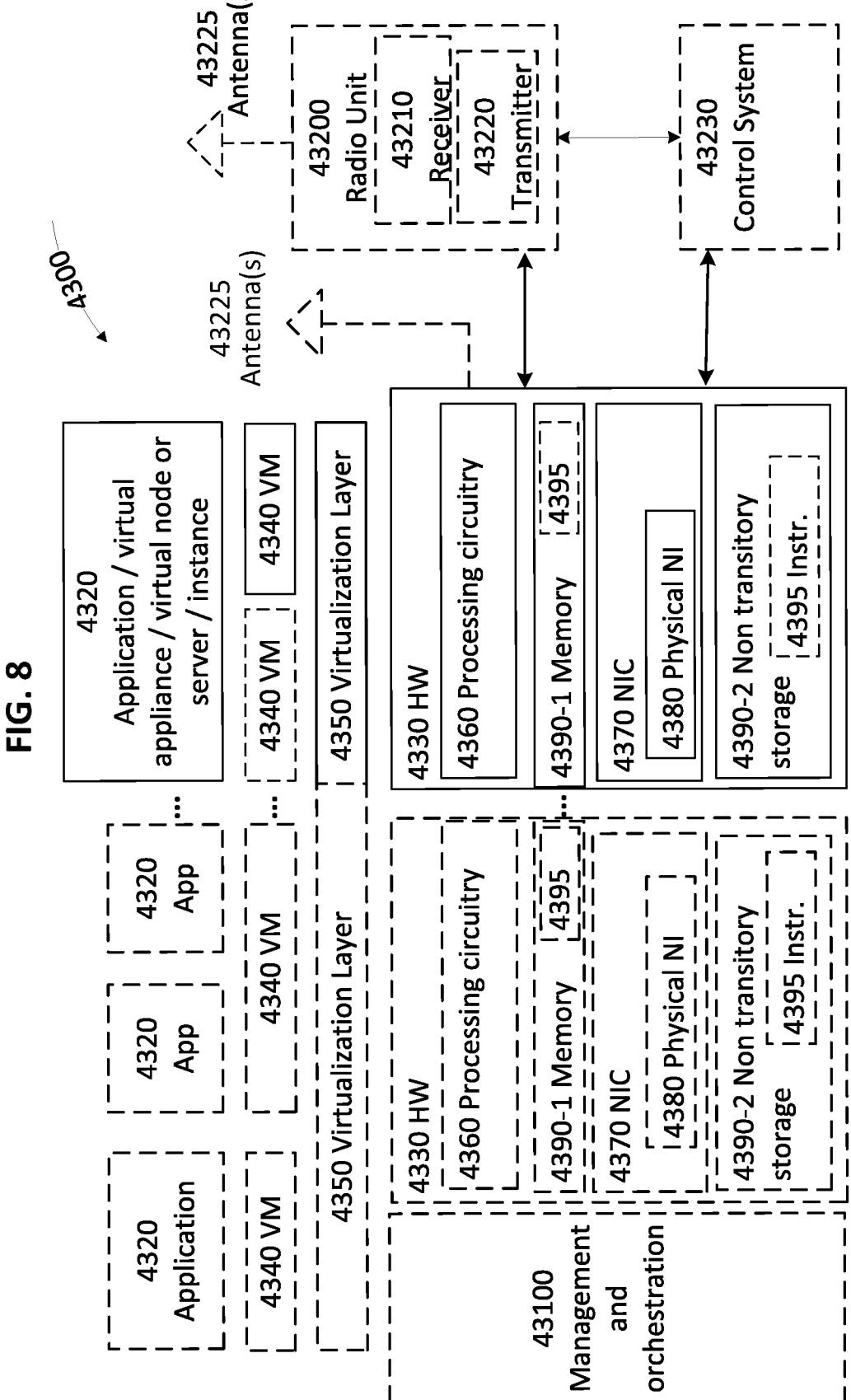
FIG. 8 is a block diagram of a virtualization environment in accordance with some embodiments.

FIG. 8 illustrates a virtualization environment in accordance with some embodiments.

FIG. 8 is a schematic block diagram illustrating a virtualization environment 4300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 4300 hosted by one or more of hardware nodes 4330. Further, in embodiments in which the virtual node is not a radio access node or does not require radio connectivity (e.g., a core network node), then the network node may be entirely virtualized.

The functions may be implemented by one or more applications 4320 (which may alternatively be called software instances, virtual appliances, network functions, virtual nodes, virtual network functions, etc.) operative to implement some of the features, functions, and/or benefits of some of the embodiments disclosed herein. Applications 4320 are run in virtualization environment 4300 which provides hardware 4330 comprising processing circuitry 4360 and memory 4390. Memory 4390 contains instructions 4395 executable by processing circuitry 4360 whereby application 4320 is operative to provide one or more of the features, benefits, and/or functions disclosed herein.

Virtualization environment 4300, comprises general-purpose or special-purpose network hardware devices 4330 comprising a set of one or more processors or processing circuitry 4360, which may be commercial off-the-shelf (COTS) processors, dedicated Application Specific Integrated Circuits (ASICs), or any other type of processing circuitry including digital or analog hardware components or special purpose processors. Each hardware device may comprise memory 4390-1 which may be non-persistent memory for temporarily storing instructions 4395 or software executed by processing circuitry 4360. Each hardware device may comprise one or more network interface controllers (NICs) 4370, also known as network interface cards, which include physical network interface 4380. Each hardware device may also include non-transitory, persistent, machine-readable storage media 4390-2 having stored therein software 4395 and/or instructions executable by processing circuitry 4360. Software 4395 may include any type of software including software for instantiating one or more virtualization layers 4350 (also referred to as hypervisors), software to execute virtual machines 4340 as well as software allowing it to execute functions, features and/or benefits described in relation with some embodiments described herein.

Virtual machines 4340 comprise virtual processing, virtual memory, virtual networking or interface and virtual storage, and may be run by a corresponding virtualization layer 4350 or hypervisor. Different embodiments of the instance of virtual appliance 4320 may be implemented on one or more of virtual machines 4340, and the implementations may be made in different ways.

During operation, processing circuitry 4360 executes software 4395 to instantiate the hypervisor or virtualization layer 4350, which may sometimes be referred to as a virtual machine monitor (VMM). Virtualization layer 4350 may present a virtual operating platform that appears like networking hardware to virtual machine 4340.

As shown in FIG. 8, hardware 4330 may be a standalone network node with generic or specific components. Hardware 4330 may comprise antenna 43225 and may implement some functions via virtualization. Alternatively, hardware 4330 may be part of a larger cluster of hardware (e.g. such as in a data center or customer premise equipment (CPE)) where many hardware nodes work together and are managed via management and orchestration (MANO) 43100, which, among others, oversees lifecycle management of applications 4320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 4340 may be a software implementation of a physical machine that runs programs as if they were executing on a physical, non-virtualized machine. Each of virtual machines 4340, and that part of hardware 4330 that executes that virtual machine, be it hardware dedicated to that virtual machine and/or hardware shared by that virtual machine with others of the virtual machines 4340, forms a separate virtual network elements (VNE).

Still in the context of NFV, Virtual Network Function (VNF) is responsible for handling specific network functions that run in one or more virtual machines 4340 on top of hardware networking infrastructure 4330 and corresponds to application 4320 in FIG. 8.

In some embodiments, one or more radio units 43200 that each include one or more transmitters 43220 and one or more receivers 43210 may be coupled to one or more antennas 43225. Radio units 43200 may communicate directly with hardware nodes 4330 via one or more appropriate network interfaces and may be used in combination with the virtual components to provide a virtual node with radio capabilities, such as a radio access node or a base station.

In some embodiments, some signalling can be effected with the use of control system 43230 which may alternatively be used for communication between the hardware nodes 4330 and radio units 43200.

Figure 9:
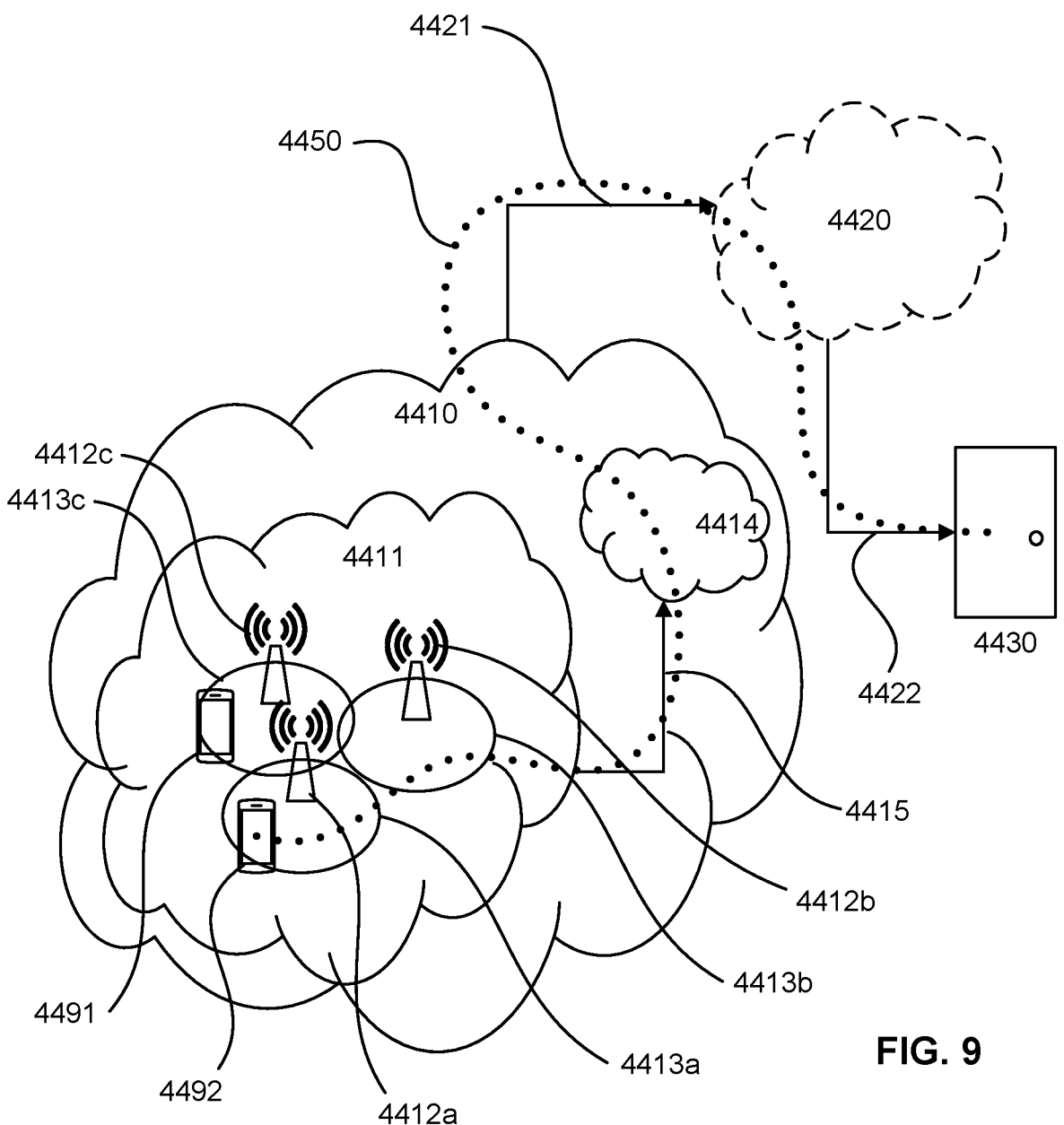
FIG. 9 is a block diagram of a telecommunication network connected via an intermediate network to a host computer in accordance with some embodiments.

FIG. 9 illustrates a telecommunication network connected via an intermediate network to a host computer in accordance with some embodiments.

With reference to FIG. 9, in accordance with an embodiment, a communication system includes telecommunication network 4410, such as a 3GPP-type cellular network, which comprises access network 4411, such as a radio access network, and core network 4414. Access network 4411 comprises a plurality of base stations 4412a, 4412b, 4412c, such as NBs, eNBs, gNBs or other types of wireless access points, each defining a corresponding coverage area 4413a, 4413b, 4413c. Each base station 4412a, 4412b, 4412c is connectable to core network 4414 over a wired or wireless connection 4415. A first UE 4491 located in coverage area

4413c is configured to wirelessly connect to, or be paged by, the corresponding base station 4412c. A second UE 4492 in coverage area 4413a is wirelessly connectable to the corresponding base station 4412a. While a plurality of UEs 4491, 4492 are illustrated in this example, the disclosed embodiments are equally applicable to a situation where a sole UE is in the coverage area or where a sole UE is connecting to the corresponding base station 4412.

Telecommunication network 4410 is itself connected to host computer 4430, which may be embodied in the hardware and/or software of a standalone server, a cloud-implemented server, a distributed server or as processing resources in a server farm. Host computer 4430 may be under the ownership or control of a service provider, or may be operated by the service provider or on behalf of the service provider. Connections 4421 and 4422 between telecommunication network 4410 and host computer 4430 may extend directly from core network 4414 to host computer 4430 or may go via an optional intermediate network 4420. Intermediate network 4420 may be one of, or a combination of more than one of, a public, private or hosted network; intermediate network 4420, if any, may be a backbone network or the Internet; in particular, intermediate network 4420 may comprise two or more sub-networks (not shown).

The communication system of FIG. 9 as a whole enables connectivity between the connected UEs 4491, 4492 and host computer 4430. The connectivity may be described as an over-the-top (OTT) connection 4450. Host computer 4430 and the connected UEs 4491, 4492 are configured to communicate data and/or signaling via OTT connection 4450, using access network 4411, core network 4414, any intermediate network 4420 and possible further infrastructure (not shown) as intermediaries. OTT connection 4450 may be transparent in the sense that the participating communication devices through which OTT connection 4450 passes are unaware of routing of uplink and downlink communications. For example, base station 4412 may not or need not be informed about the past routing of an incoming downlink communication with data originating from host computer 4430 to be forwarded (e.g., handed over) to a connected UE 4491. Similarly, base station 4412 need not be aware of the future routing of an outgoing uplink communication originating from the UE 4491 towards the host computer 4430.

Figure 10:
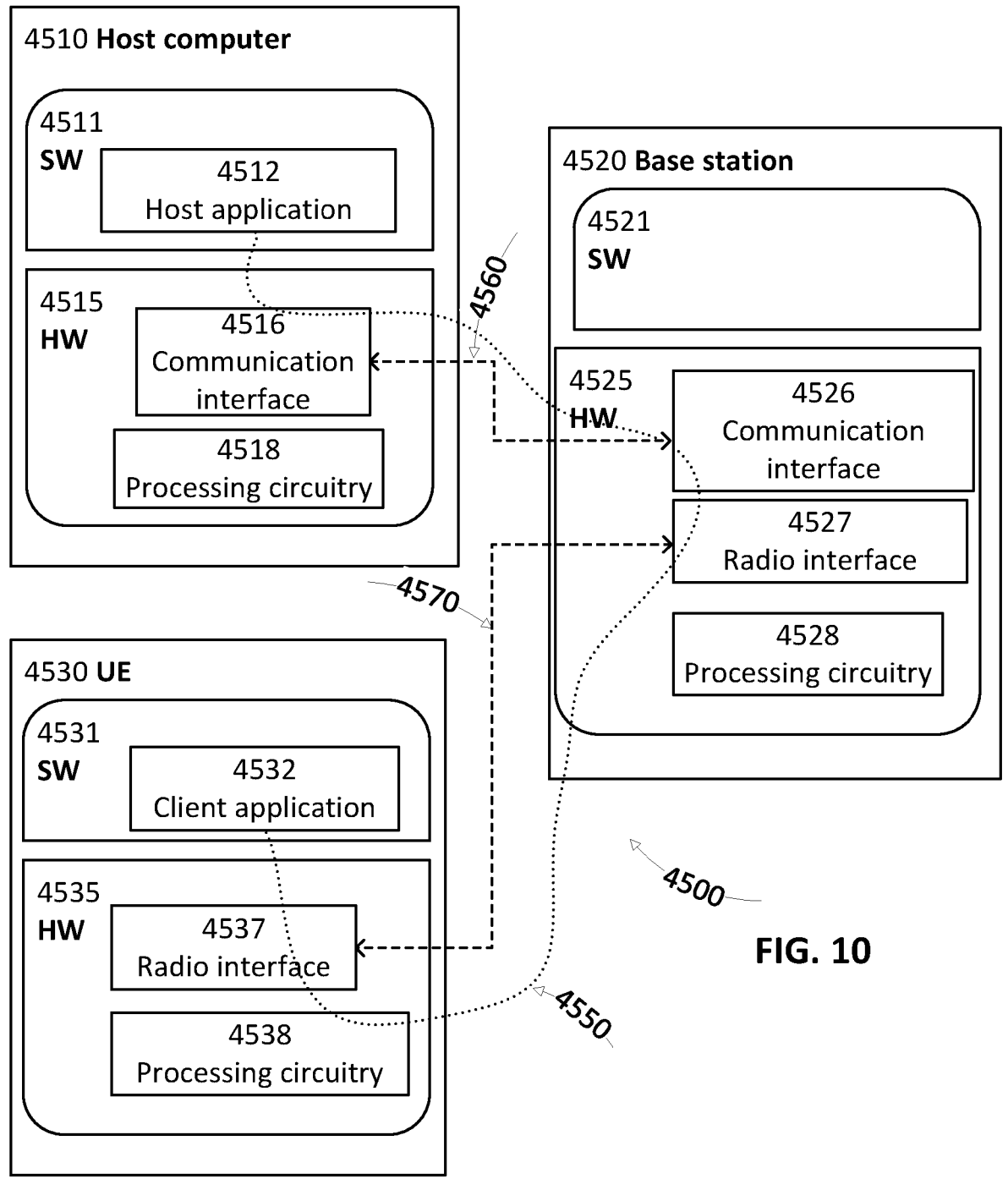
FIG. 10 is a block diagram of a host computer communicating via a base station with a user equipment over a partially wireless connection in accordance with some embodiments.

FIG. 10 illustrates a host computer communicating via a base station with a user equipment over a partially wireless connection in accordance with some embodiments.

Example implementations, in accordance with an embodiment, of the UE, base station and host computer discussed in the preceding paragraphs will now be described with reference to FIG. 10. In communication system 4500, host computer 4510 comprises hardware 4515 including communication interface 4516 configured to set up and maintain a wired or wireless connection with an interface of a different communication device of communication system 4500. Host computer 4510 further comprises processing circuitry 4518, which may have storage and/or processing capabilities. In particular, processing circuitry 4518 may comprise one or more programmable processors, application-specific integrated circuits, field programmable gate arrays or combinations of these (not shown) adapted to execute instructions. Host computer 4510 further comprises software 4511, which is stored in or accessible by host computer 4510 and executable by processing circuitry 4518. Software 4511 includes host application 4512. Host application 4512 may be operable to provide a service to a remote user, such as UE 4530 connecting via OTT connection 4550 terminating at UE 4530 and host computer 4510. In providing the service to the remote user, host application 4512 may provide user data which is transmitted using OTT connection 4550.

Communication system 4500 further includes base station 4520 provided in a telecommunication system and comprising hardware 4525 enabling it to communicate with host computer 4510 and with UE 4530. Hardware 4525 may include communication interface 4526 for setting up and maintaining a wired or wireless connection with an interface of a different communication device of communication system 4500, as well as radio interface 4527 for setting up and maintaining at least wireless connection 4570 with UE 4530 located in a coverage area (not shown in FIG. 10) served by base station 4520. Communication interface 4526 may be configured to facilitate connection 4560 to host computer 4510. Connection 4560 may be direct or it may pass through a core network (not shown in FIG. 10) of the telecommunication system and/or through one or more intermediate networks outside the telecommunication system. In the embodiment shown, hardware 4525 of base station 4520 further includes processing circuitry 4528, which may comprise one or more programmable processors, application-specific integrated circuits, field programmable gate arrays or combinations of these (not shown) adapted to execute instructions. Base station 4520 further has software 4521 stored internally or accessible via an external connection.

Communication system 4500 further includes UE 4530 already referred to. Its hardware 4535 may include radio interface 4537 configured to set up and maintain wireless connection 4570 with a base station serving a coverage area in which UE 4530 is currently located. Hardware 4535 of UE 4530 further includes processing circuitry 4538, which may comprise one or more programmable processors, application-specific integrated circuits, field programmable gate arrays or combinations of these (not shown) adapted to execute instructions. UE 4530 further comprises software 4531, which is stored in or accessible by UE 4530 and executable by processing circuitry 4538. Software 4531 includes client application 4532. Client application 4532 may be operable to provide a service to a human or non-human user via UE 4530, with the support of host computer 4510. In host computer 4510, an executing host application 4512 may communicate with the executing client application 4532 via OTT connection 4550 terminating at UE 4530 and host computer 4510. In providing the service to the user, client application 4532 may receive request data from host application 4512 and provide user data in response to the request data. OTT connection 4550 may transfer both the request data and the user data. Client application 4532 may interact with the user to generate the user data that it provides.

It is noted that host computer 4510, base station 4520 and UE 4530 illustrated in FIG. 10 may be similar or identical to host computer 4430, one of base stations 4412a, 4412b, 4412c and one of UEs 4491, 4492 of FIG. 9, respectively. This is to say, the inner workings of these entities may be as shown in FIG. 10 and independently, the surrounding network topology may be that of FIG. 9.

In FIG. 10, OTT connection 4550 has been drawn abstractly to illustrate the communication between host computer 4510 and UE 4530 via base station 4520, without explicit reference to any intermediary devices and the precise routing of messages via these devices. Network infrastructure may determine the routing, which it may be configured to hide from UE 4530 or from the service provider operating host computer 4510, or both. While OTT connection 4550 is active, the network infrastructure may further take decisions by which it dynamically changes the routing (e.g., on the basis of load balancing consideration or reconfiguration of the network).

Wireless connection 4570 between UE 4530 and base station 4520 is in accordance with the teachings of the embodiments described throughout this disclosure. One or more of the various embodiments may improve the performance of OTT services provided to UE 4530 using OTT connection 4550, in which wireless connection 4570 forms the last segment. More precisely, the teachings of these embodiments may improve the random access speed and/or reduce random access failure rates and thereby provide benefits such as faster and/or more reliable random access.

A measurement procedure may be provided for the purpose of monitoring data rate, latency and other factors on which the one or more embodiments improve. There may further be an optional network functionality for reconfiguring OTT connection 4550 between host computer 4510 and UE 4530, in response to variations in the measurement results. The measurement procedure and/or the network functionality for reconfiguring OTT connection 4550 may be implemented in software 4511 and hardware 4515 of host computer 4510 or in software 4531 and hardware 4535 of UE 4530, or both. In embodiments, sensors (not shown) may be deployed in or in association with communication devices through which OTT connection 4550 passes; the sensors may participate in the measurement procedure by supplying values of the monitored quantities exemplified above, or supplying values of other physical quantities from which software 4511, 4531 may compute or estimate the monitored quantities. The reconfiguring of OTT connection 4550 may include message format, retransmission settings, preferred routing etc.; the reconfiguring need not affect base station 4520, and it may be unknown or imperceptible to base station 4520. Such procedures and functionalities may be known and practiced in the art. In certain embodiments, measurements may involve proprietary UE signaling facilitating host computer 4510's measurements of throughput, propagation times, latency and the like. The measurements may be implemented in that software 4511 and 4531 causes messages to be transmitted, in particular empty or 'dummy' messages, using OTT connection 4550 while it monitors propagation times, errors etc.

Figure 11:
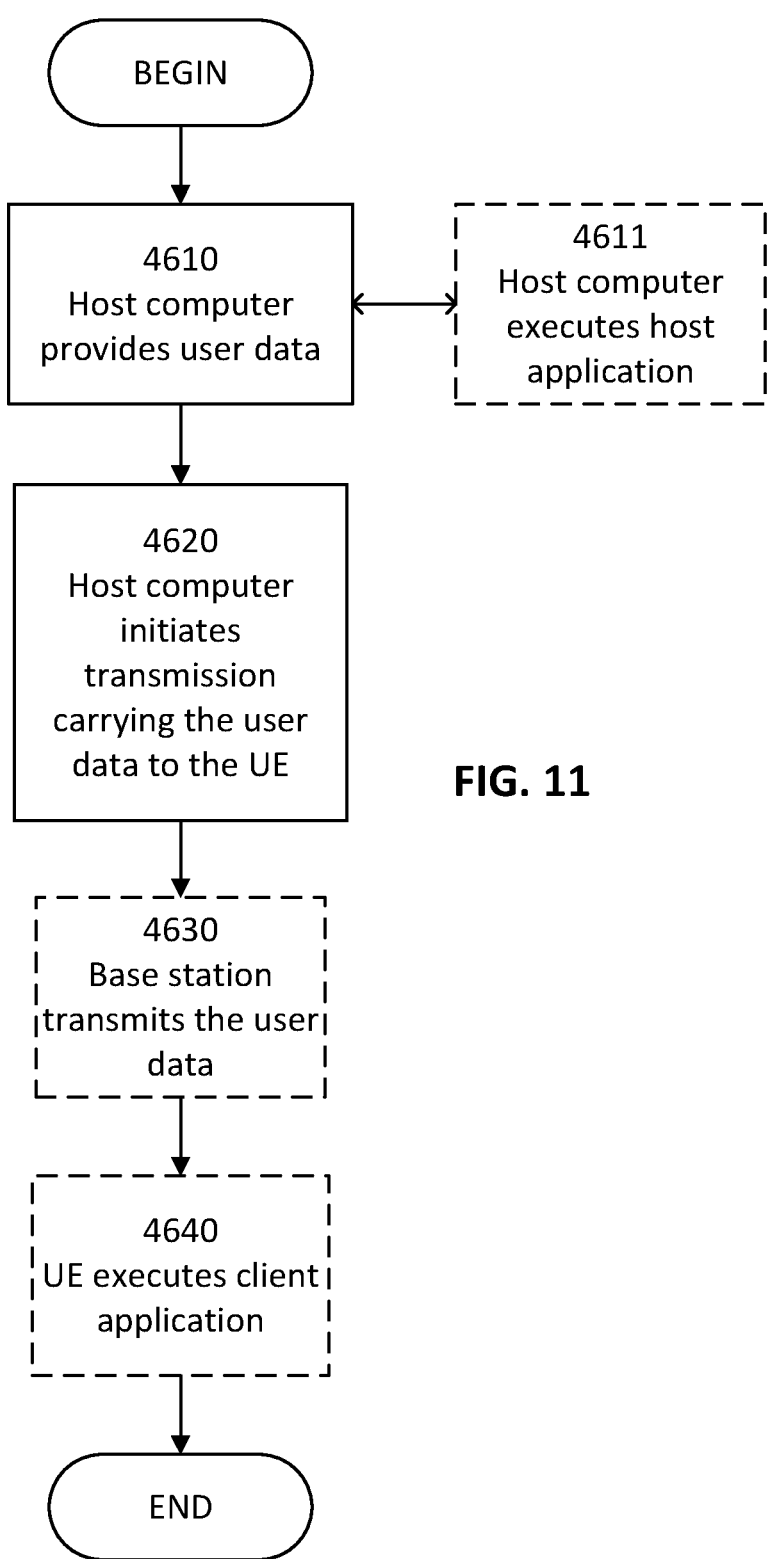
FIG. 11 is a block diagram of methods implemented in a communication system including a host computer, a base station and a user equipment in accordance with some embodiments.

FIG. 11 illustrates methods implemented in a communication system including a host computer, a base station and a user equipment in accordance with some embodiments.

FIG. 11 is a flowchart illustrating a method implemented in a communication system, in accordance with one embodiment. The communication system includes a host computer, a base station and a UE which may be those described with reference to FIGS. 9 and 10. For simplicity of the present disclosure, only drawing references to FIG. 11 will be included in this section. In step 4610, the host computer provides user data. In substep 4611 (which may be optional) of step 4610, the host computer provides the user data by executing a host application. In step 4620, the host computer initiates a transmission carrying the user data to the UE. In step 4630 (which may be optional), the base station transmits to the UE the user data which was carried in the transmission that the host computer initiated, in accordance with the teachings of the embodiments described throughout this disclosure. In step 4640 (which may also be optional), the UE executes a client application associated with the host application executed by the host computer.

Figure 12:
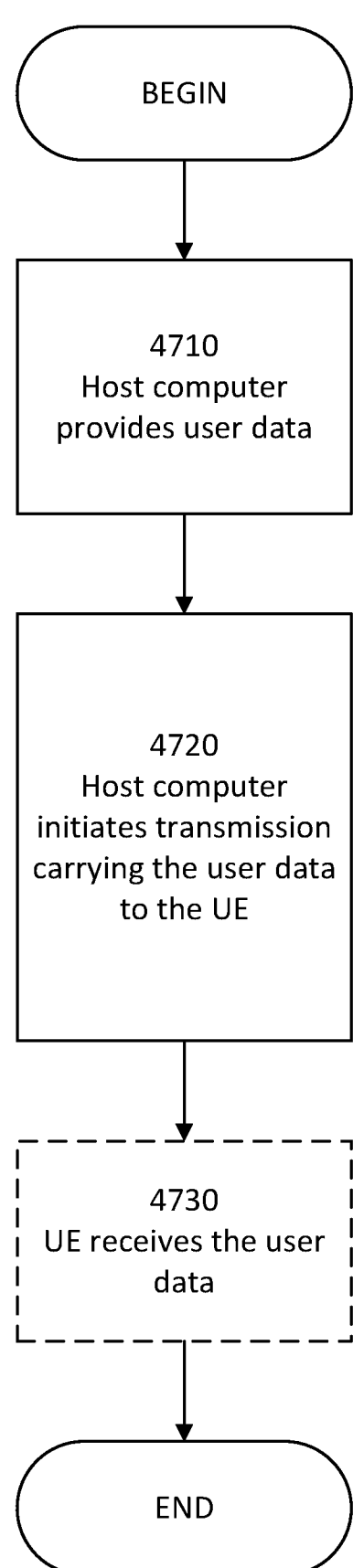
FIG. 12 is a block diagram of methods implemented in a communication system including a host computer, a base station and a user equipment in accordance with some embodiments.

FIG. 12 illustrates methods implemented in a communication system including a host computer, a base station and a user equipment in accordance with some embodiments.

FIG. 12 is a flowchart illustrating a method implemented in a communication system, in accordance with one embodiment. The communication system includes a host computer, a base station and a UE which may be those described with reference to FIGS. 9 and 10. For simplicity of the present disclosure, only drawing references to FIG. 12 will be included in this section. In step 4710 of the method, the host computer provides user data. In an optional substep (not shown) the host computer provides the user data by executing a host application. In step 4720, the host computer initiates a transmission carrying the user data to the UE. The transmission may pass via the base station, in accordance with the teachings of the embodiments described throughout this disclosure. In step 4730 (which may be optional), the UE receives the user data carried in the transmission.

Figure 13:
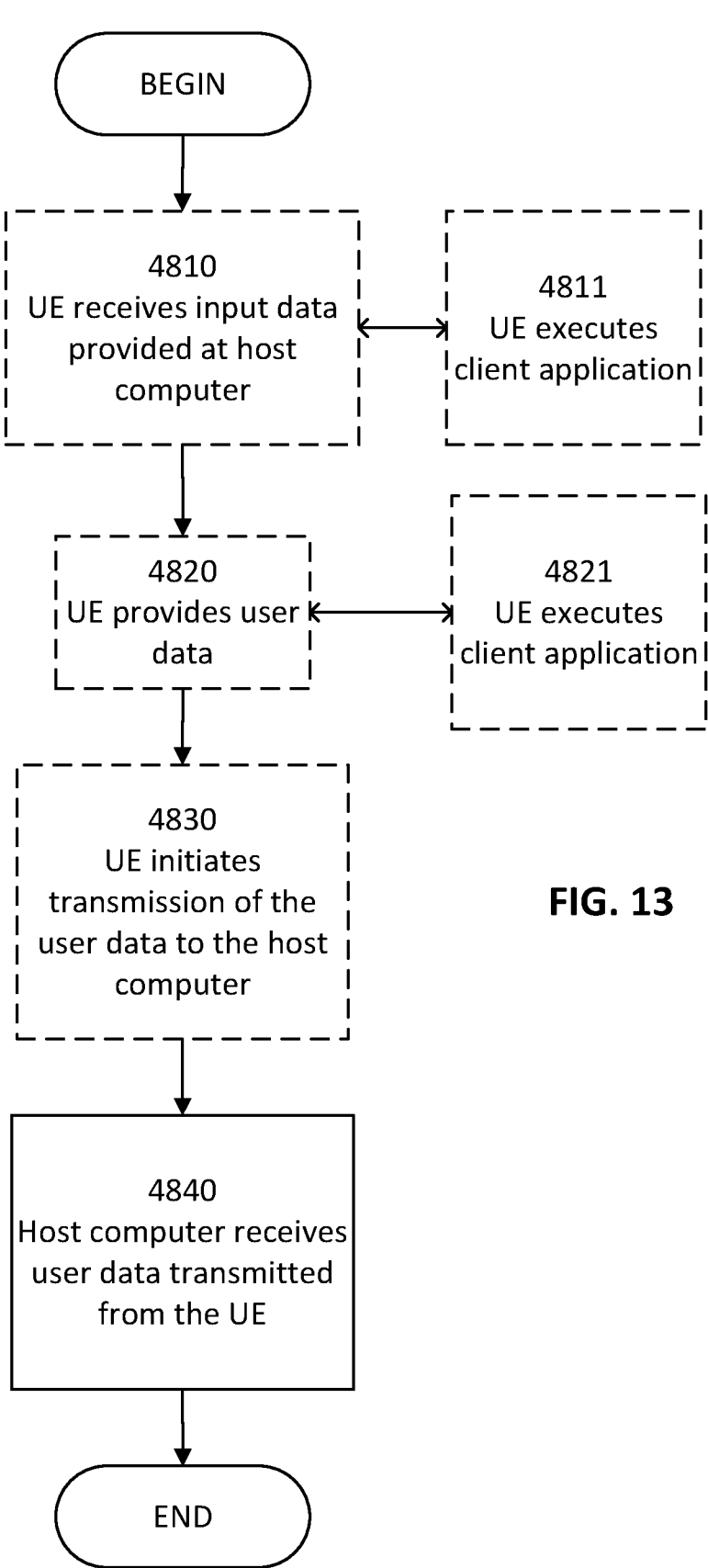
FIG. 13 is a block diagram of methods implemented in a communication system including a host computer, a base station and a user equipment in accordance with some embodiments.

FIG. 13 illustrates methods implemented in a communication system including a host computer, a base station and a user equipment in accordance with some embodiments FIG. 13 is a flowchart illustrating a method implemented in a communication system, in accordance with one embodiment. The communication system includes a host computer, a base station and a UE which may be those described with reference to FIGS. 9 and 10. For simplicity of the present disclosure, only drawing references to FIG. 13 will be included in this section. In step 4810 (which may be optional), the UE receives input data provided by the host computer. Additionally or alternatively, in step 4820, the UE provides user data. In substep 4821 (which may be optional) of step 4820, the UE provides the user data by executing a client application. In substep 4811 (which may be optional) of step 4810, the UE executes a client application which provides the user data in reaction to the received input data provided by the host computer. In providing the user data, the executed client application may further consider user input received from the user. Regardless of the specific manner in which the user data was provided, the UE initiates, in substep 4830 (which may be optional), transmission of the user data to the host computer. In step 4840 of the method, the host computer receives the user data transmitted from the UE, in accordance with the teachings of the embodiments described throughout this disclosure.

Figure 14:
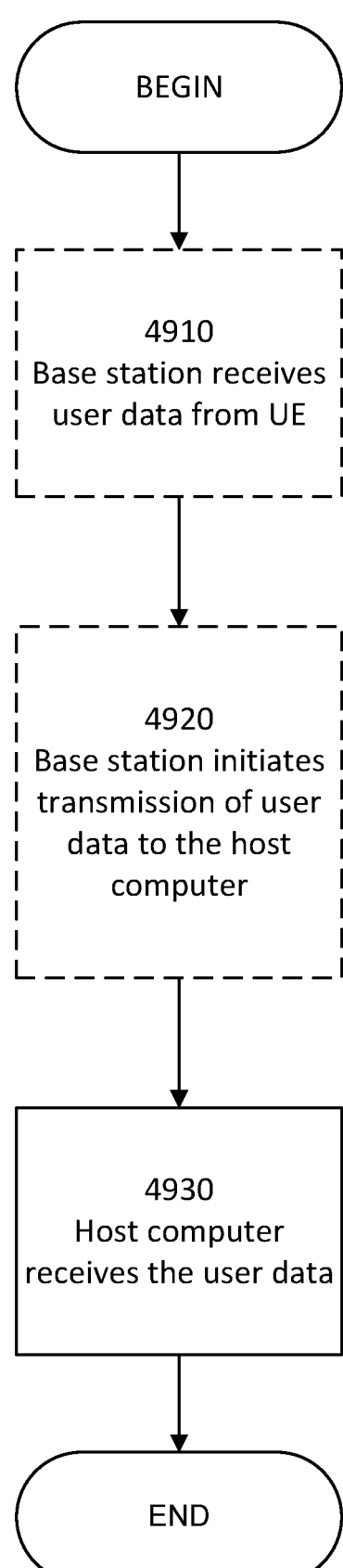
FIG. 14 is a block diagram of methods implemented in a communication system including a host computer, a base station and a user equipment in accordance with some embodiments.

FIG. 14 illustrates methods implemented in a communication system including a host computer, a base station and a user equipment in accordance with some embodiments FIG. 14 is a flowchart illustrating a method implemented in a communication system, in accordance with one embodiment. The communication system includes a host computer, a base station and a UE which may be those described with reference to FIGS. 9 and 10. For simplicity of the present disclosure, only drawing references to FIG. 14 will be included in this section. In step 4910 (which may be optional), in accordance with the teachings of the embodiments described throughout this disclosure, the base station receives user data from the UE. In step 4920 (which may be optional), the base station initiates transmission of the received user data to the host computer. In step 4930 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Abbreviations

At least some of the following abbreviations may be used in this disclosure. If there is an inconsistency between abbreviations, preference should be given to how it is used above. If listed multiple times below, the first listing should be preferred over any subsequent listing(s).

1×RTT CDMA2000 1× Radio Transmission Technology
3GPP 3rd Generation Partnership Project
5G 5th Generation
ABS Almost Blank Subframe
ARQ Automatic Repeat Request
AWGN Additive White Gaussian Noise
BCCH Broadcast Control Channel
BCH Broadcast Channel
CA Carrier Aggregation
CC Carrier Component
CCCH SDU Common Control Channel SDU
CDMA Code Division Multiplexing Access
CGI Cell Global Identifier
CIR Channel Impulse Response
CP Cyclic Prefix
CPICH Common Pilot Channel
CPICH Ec/No CPICH Received energy per chip divided
    by the power density in the band
CQI Channel Quality information
C-RNTI Cell RNTI
CSI Channel State Information
DCCH Dedicated Control Channel
DL Downlink
DM Demodulation
DMRS Demodulation Reference Signal
DRX Discontinuous Reception
DTX Discontinuous Transmission
DTCH Dedicated Traffic Channel
DUT Device Under Test
E-CID Enhanced Cell-ID (positioning method)
E-SMLC Evolved-Serving Mobile Location Centre
ECGI Evolved CGI
eNB E-UTRAN NodeB
ePDCCH enhanced Physical Downlink Control Channel
E-SMLC evolved Serving Mobile Location Center
E-UTRA Evolved UTRA
E-UTRAN Evolved UTRAN

US 12,587,962 B2

39

FDD Frequency Division Duplex
FFS For Further Study
GERAN GSM EDGE Radio Access Network
gNB Base station in NR
GNSS Global Navigation Satellite System
GSM Global System for Mobile communication
HARQ Hybrid Automatic Repeat Request
HO Handover
HSPA High Speed Packet Access
HRPD High Rate Packet Data
LOS Line of Sight
LPP LTE Positioning Protocol
LTE Long-Term Evolution
MAC Medium Access Control
MBMS Multimedia Broadcast Multicast Services
MBSFN Multimedia Broadcast multicast service Single
    Frequency Network
MBSFN ABS MBSFN Almost Blank Subframe
MDT Minimization of Drive Tests
MIB Master Information Block
MME Mobility Management Entity
MSC Mobile Switching Center
NPDCCH Narrowband Physical Downlink Control Chan-
    nel
NR New Radio
OCNG OFDMA Channel Noise Generator
OFDM Orthogonal Frequency Division Multiplexing
OFDMA Orthogonal Frequency Division Multiple Access
OSS Operations Support System
OTDOA Observed Time Difference of Arrival
O&M Operation and Maintenance
PBCH Physical Broadcast Channel
P-CCPCH Primary Common Control Physical Channel
PCell Primary Cell
PCFICH Physical Control Format Indicator Channel
PDCCH Physical Downlink Control Channel
PDP Profile Delay Profile
PDSCH Physical Downlink Shared Channel
PGW Packet Gateway
PHICH Physical Hybrid-ARQ Indicator Channel
PLMN Public Land Mobile Network
PMI Precoder Matrix Indicator
PRACH Physical Random Access Channel
PRS Positioning Reference Signal
PSS Primary Synchronization Signal
PUCCH Physical Uplink Control Channel
PUSCH Physical Uplink Shared Channel
RACH Random Access Channel
QAM Quadrature Amplitude Modulation
RAN Radio Access Network
RAT Radio Access Technology
RLM Radio Link Management
RNC Radio Network Controller
RNTI Radio Network Temporary Identifier
RRC Radio Resource Control
RRM Radio Resource Management
RS Reference Signal
RSCP Received Signal Code Power
RSRP Reference Symbol Received Power OR Reference
    Signal Received Power
RSRQ Reference Signal Received Quality OR Reference
    Symbol Received Quality
RSSI Received Signal Strength Indicator
RSTD Reference Signal Time Difference
SCH Synchronization Channel
SCell Secondary Cell
SDU Service Data Unit

40

SFN System Frame Number
SGW Serving Gateway
SI System Information
SIB System Information Block
SNR Signal to Noise Ratio
SON Self Optimized Network
SS Synchronization Signal
SSS Secondary Synchronization Signal
TDD Time Division Duplex
TDOA Time Difference of Arrival
TOA Time of Arrival
TSS Tertiary Synchronization Signal
TTI Transmission Time Interval
UE User Equipment
UL Uplink
UMTS Universal Mobile Telecommunication System
USIM Universal Subscriber Identity Module
UTDOA Uplink Time Difference of Arrival
UTRA Universal Terrestrial Radio Access
UTRAN Universal Terrestrial Radio Access Network
WCDMA Wide CDMA
WLAN Wide Local Area Network Further definitions and embodiments are discussed below.
In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belong. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" (abbreviated "/") includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the examples of embodiments and their equivalents, and shall not be restricted or limited by the foregoing detailed description.

The invention claimed is:

1. A method of operating a communication device, wherein the communication device is configured with a plurality of cells to provide carrier aggregation for communication with a wireless communication network, the method comprising:

receiving an instruction to activate a cell of the plurality of cells that are configured for the communication device; and starting a discontinuous reception (DRX) inactivity timer associated with the cell of the plurality of cells responsive to receiving the instruction to activate the cell of the plurality of cells, wherein:

a first DRX inactivity timer is associated with a first cell of the plurality of cells, the cell of the plurality of cells is a second cell, the DRX inactivity timer associated with the cell of the plurality of cells is a second DRX inactivity timer associated with the second cell, and the instruction to activate the second cell is received over the first cell.

2. The method of claim 1, further comprising:

monitoring a downlink control channel for scheduling information relating to the cell of the plurality of cells over a duration of the DRX inactivity timer defined by an inactivity timer duration after starting the DRX inactivity timer.

3. The method of claim 2, wherein the downlink control channel is monitored over another cell associated with the DRX inactivity timer different from the cell of the plurality of cells.

4. The method of claim 2, wherein the downlink control channel is monitored over the cell of the plurality of cells.

5. The method of claim 1, wherein the DRX inactivity timer is running when the instruction to activate the cell is received, and wherein starting the DRX inactivity timer comprises restarting the DRX inactivity timer associated with the cell of the plurality of cells.

6. The method of claim 1, wherein receiving the instruction comprises decoding the instruction to activate the cell of the plurality of cells, and wherein starting the DRX inactivity timer comprises starting the DRX inactivity timer responsive to decoding the instruction to activate the cell of the plurality of cells.

7. The method of claim 6, wherein a user equipment (UE) is configured with a DRX inactivity timer delay, and wherein starting the DRX inactivity timer comprises starting the DRX inactivity timer after passing of the DRX inactivity timer delay after receiving the instruction to activate the cell.

8. The method of claim 1, wherein the first cell is associated with a first DRX process defining the first DRX inactivity timer and defining a first on duration timer, and wherein the second cell is associated with a second DRX process defining the second DRX inactivity timer and defining a second on duration timer.

9. The method of claim 8, wherein durations of the first and second on duration timers are different.

10. The method of claim 1, wherein durations of the first and second DRX inactivity timers are different.

11. The method of claim 1, further comprising:
transmitting a capability indication to the wireless communication network, wherein the capability indication indicates that the communication device has a capability to monitor scheduling information relating to the second cell responsive to an activation instruction.

12. The method of claim 1, wherein the instruction to activate the cell of the plurality of cells is received in a Medium Access Control (MAC) Control Element (CE).

13. A method of operating a node of a wireless communication network in communication with a communication device, wherein the communication device is configured with a plurality of cells to provide carrier aggregation, wherein a first cell of the plurality of cells is associated with a first discontinuous reception (DRX) inactivity timer having a first inactivity timer duration, and wherein a second cell of the plurality of cells is associated with a second DRX inactivity timer having a second inactivity timer duration different from the first inactivity timer duration, the method comprising:
transmitting an instruction to the communication device to activate the second cell that is associated with the second DRX inactivity timer, where the instruction is transmitted over the first cell associated with the first DRX inactivity timer; and
transmitting scheduling information relating to the second cell for the communication device during a period defined by the second inactivity timer duration following the instruction.

14. The method of claim 13, wherein the instruction is transmitted responsive to an amount of downlink data for the communication device exceeding a downlink threshold, and wherein transmitting the scheduling information comprises transmitting the scheduling information responsive to the amount of downlink data for the communication device exceeding the downlink threshold.

15. The method of claim 13, wherein the instruction is transmitted responsive to an amount of uplink data for the communication device exceeding an uplink threshold, and wherein transmitting the scheduling information comprises transmitting the scheduling information responsive to the amount of uplink data for the communication device exceeding the uplink threshold.

16. The method of claim 13, further comprising:
receiving a capability indication from the communication device, wherein the capability indication indicates that the communication device has a capability to monitor scheduling information relating to the second cell responsive to an activation instruction, and wherein the instruction is transmitted responsive to receiving the capability indication from the communication device.

17. The method of claim 13, wherein the scheduling information is transmitted over a third cell of the plurality of cells, and wherein the third cell is associated with the second DRX inactivity timer.

18. The method of claim 13, wherein the scheduling information is over the second cell of the plurality of cells.

19. The method of claim 13, wherein a user equipment (UE) is configured with an inactivity timer delay, and wherein the scheduling information is transmitted during the period defined by the second inactivity timer duration after passing of the inactivity timer delay after transmitting the instruction to activate the second cell.

* * * * *